United States Patent [19]
Kirii et al.

[11] Patent Number: 5,450,756
[45] Date of Patent: Sep. 19, 1995

[54] DEVICE AND METHOD FOR MEASURING AND ADJUSTING PRESSING LOAD VALUES ON A PRESS

[75] Inventors: Kazunari Kirii, Aichi; Masahiro Shinabe, Toyota, both of Japan

[73] Assignee: Toyota Jidosha Kabushiki Kaisha, Japan

[21] Appl. No.: 144,513

[22] Filed: Nov. 2, 1993

[30] Foreign Application Priority Data

Nov. 6, 1992 [JP] Japan .................................. 4-322405
Apr. 28, 1993 [JP] Japan .................................. 5-125291

[51] Int. Cl.⁶ .............................................. G01N 3/10
[52] U.S. Cl. .................................................... 73/825
[58] Field of Search ...................... 73/825, 818, 862.53, 73/862.54; 100/99, 43, 48, 50, 53, 257

[56] References Cited

U.S. PATENT DOCUMENTS

| | | | |
|---|---|---|---|
| 4,332,175 | 6/1982 | Krainski | 73/825 |
| 4,453,421 | 6/1984 | Umano | 73/862.54 |
| 4,979,401 | 12/1990 | Maeda | 73/862.54 |

FOREIGN PATENT DOCUMENTS

| | | |
|---|---|---|
| 3530204 | 10/1986 | Germany . |
| 57-30919 | 2/1982 | Japan . |
| 58-187223 | 11/1983 | Japan . |
| 59-118298 | 7/1984 | Japan . |
| 63-180400 | 7/1988 | Japan . |
| 3-33079 | 5/1991 | Japan . |
| 2127973 | 4/1984 | United Kingdom . |

OTHER PUBLICATIONS

Research Disclosure, vol. 309, No. 81, Jan. 1990, "Transfer Press Parallelism", by E. A. Herman, pp. 59-63 (w/abstract).
European Search Report dated Dec. 21, 1993.
Communication dated Jan. 28, 1994.

*Primary Examiner*—Richard E. Chilcot, Jr.
*Assistant Examiner*—Harshad Patel
*Attorney, Agent, or Firm*—Finnegan, Henderson, Farabow, Garrett & Dunner

[57] ABSTRACT

A pressing load measuring device including a memory for storing a data map representative of a relationship between the output level of a strain sensor attached to a press frame and the actual pressing load value on the press, and a converter for converting the output of the strain sensor into the pressing load value on the basis of the sensor output and according to the stored relationship. Local pressing load values acting on local portions of a press slide through fluid-actuated cylinders are measured by a method wherein the actual local pressing load values at the local portions of the press slide are measured, and the pressure values of a fluid in the fluid-actuated cylinders independently of each other so that the measured actual local pressing load values at the local portions of the press slide substantially coincide with respective predetermined optimum values.

16 Claims, 24 Drawing Sheets

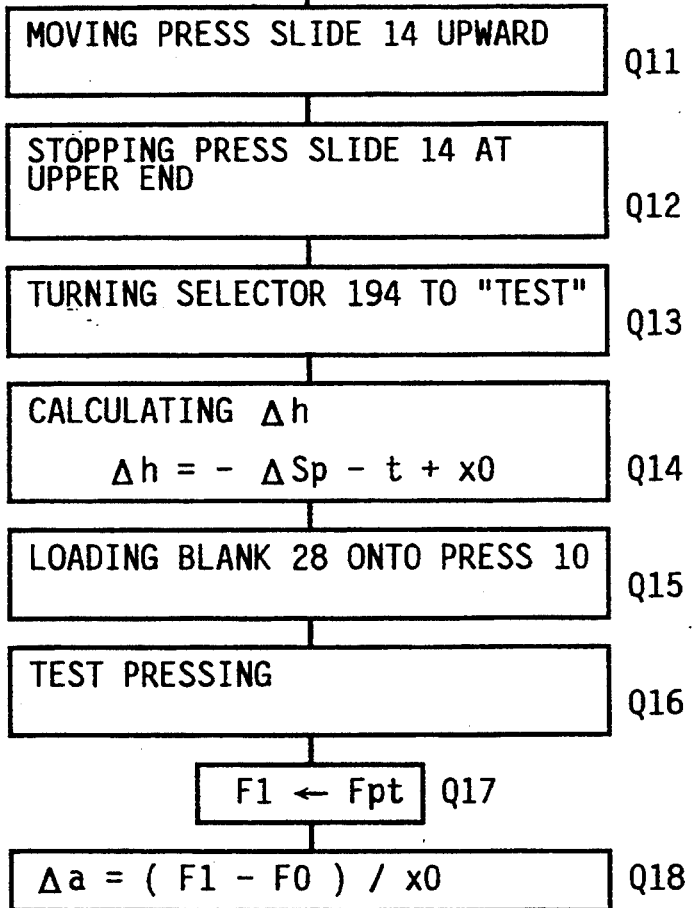

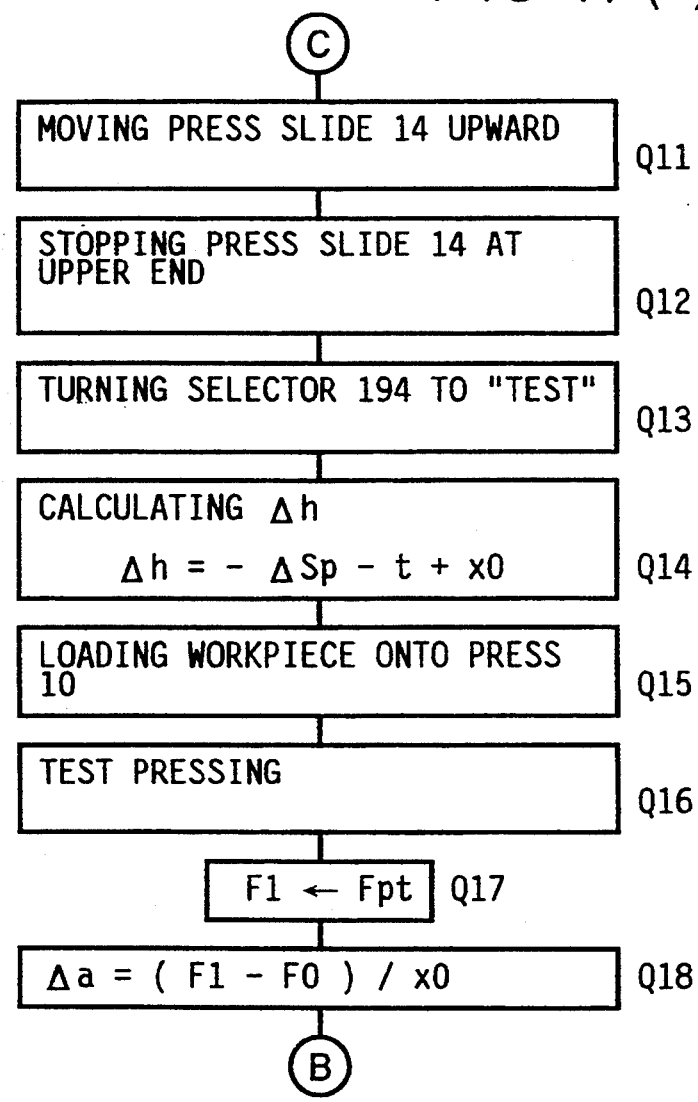

DEVICE AND METHOD FOR MEASURING AND ADJUSTING PRESSING LOAD VALUES ON A PRESS

BACKGROUND OF THE INVENTION

1. Field of the Invention

The present invention relates in general to a device and a method for measuring and adjusting pressing load values on a press-forming machine, and more particularly to a device capable of measuring the pressing load values with high accuracy using strain sensors, and a method of adjusting local pressing load values to optimum values independently of each other so as to establish a predetermined local load distribution of the press.

2. Discussion of the Related Art

A press having a vertically reciprocating slide with an upper die is widely used for producing bodies of an automotive vehicle and other articles. For adjusting or monitoring load values on such a press, it is practiced to attach suitable strain sensors on the frame members which support a press slide, and measure the load values on the press on the basis of the amounts of elongation of the frame members. The strain sensors may be attached to suitable members of a drive mechanism for reciprocating the press slide. The measurement of the load values is based on the assumption that a pressing force F is proportional to the amount of strain $\epsilon$. The pressing force F is obtained according to the following equation (1):

$$F = a\epsilon \quad (1)$$

where, a = predetermined proportion constant.

JP-A-57-30919 (laid-open publication of Japanese Patent Application) discloses an example of a device operated on the above assumption, wherein a permanent magnet and a Hall element are used as a strain sensor. The strain sensor may be any other suitable means for detecting the amount of elongation of a frame member of the press, which may be of dial gage type, electrical capacitance type, strain gage type, optical type, differential transformer type or rotary encoder type.

However, the pressing force F at a given position on a press slide adapted to perform a pressing action with an upper and a lower die is not necessarily sufficiently linearly proportional to the amount of strain of the frame members, due to various fluctuating factors such as positional errors associated with the press slide, die set and frame members, specific configurations of the frame members, and gear backlash of the drive mechanism to drive the press slide. Accordingly, the amount of strain $\epsilon$ as detected by the strain gages will not accurately represent the actual local pressing force value F. Solid and one-dot chain lines in the graph of FIG. 7 represent examples of an actual local pressing force value Fpi, and the level of an output signal Si of a strain sensor, respectively. It will be understood from the graph that although the pressing force value Fpi and the strain sensor output level Si may be partially coincident with each other by the use of a suitable proportion constant $\alpha$, these two values are not linearly proportional with each other over the entire range of the effective pressing stroke of the press slide.

When the press has two or more frame members, a strain sensor is attached to each of the frame members. In this case, the total pressing load is equal to a sum of the local pressing load values as represented by the outputs of the individual strain sensors. Usually, a proportion constant a is used for the total output of the strain sensors to obtain the total pressing load from the total sensor output. This proportion constant a is also used to obtain the local pressing load values from the outputs of the individual strain sensors. Therefore, the obtained local pressing load values are not necessarily sufficiently accurate. Accordingly, for example, it is not possible to precisely detect the distribution of local holding forces which act on the workpiece or blank at the respective local portions of the press slide or die set. Further, the detected local pressing load values do not permit accurate adjustment of the local pressing load values to the optimum values as found or established on a test press when the die set is prepared.

To establish the optimum local pressing load values suitable for the specific die set used, a press is usually provided with a plurality of height-adjusting mechanisms at respective local positions on the press, for adjusting a relative distance (indicated at h1 in FIG. 2, for example) between the press slide and the drive mechanism. This height-adjusting mechanisms permit efficient reproduction of the optimum local pressing load values on the press in a production line.

However, the relationship between the actual local load value and the relative distance as defined above at one local position on the press differs from those at the other local positions, due to plays and gear backlash of the drive mechanism for the press slide, parallelism variation of the press slide, and dimensional errors and rigidity variation of the individual components of the press. Consequently, while the height-adjusting mechanisms permit the adjustment of the total pressing load, the distribution of the local load values differs on the individual pressing machines, whereby the articles produced by the individual machines do not necessarily have an intended quality, even if the total load is adequately adjusted. In this respect, it is considered possible to adjust the press depending upon the specific die set used, so as to obtain the intended quality of the product. Where the press in question is used with the different die sets for producing different articles, the adjustment of the press for one die set will influence the quality of the articles to be produced by the other die sets. In view of this fact, it is generally practiced to adjust the die set per se depending upon the characteristics of the press.

SUMMARY OF THE INVENTION

It is therefore a first object of the present invention to provide a device for accurately measuring the pressing load values on a press, by using strain sensors attached on the frame members of the press.

It is a second object of the invention to provide a method by which the local pressing load values on a press can be easily adjusted to as to establish the desired local load distribution, irrespective of the specific characteristics of the press.

The first object may be achieved according to one aspect of the present invention, which provides a device for measuring a pressing load value on a press having a press slide and a frame for supporting the press slide, the device including at least one strain sensor attached to the frame for detecting an amount of elongation of the frame, and measuring the pressing load value on the basis of an output of the at least one strain sensor, the device comprising: memory means for storing a data map representative of a relationship between a level of the output of the at least one strain sensor and an actual pressing load value at a pressing portion of the press; and converting means for converting the output of the at least one strain sensor into the pressing load value according to the relationship whose data map is stored in the memory means.

The data map stored in the memory means is prepared prior to a pressing operation on the press, by measuring the actual pressing load value at the pressing portion corresponding to each strain sensor, and the output level of each strain sensor in relation to the measured actual pressing load value. This measurement is effected by changing the actual value of the pressing load applied to the press at the pressing portion. The data map representative of the actually measured relationship between the pressing load value and the sensor output level is stored in the memory mans. During a pressing operation on the press, the pressing load value is obtained by the converting means, on the basis of the output level of the strain sensor representative of the amount of strain of the press frame and according to the stored relationship. This arrangement assures improved accuracy of measurement of the actual pressing load value on the basis of the output of the strain sensor.

The instant load measuring device may use a plurality of strain sensors attached to respective frame members of the frame. In this case, the memory means stores data maps representative of respective relationships between the level of output signals of the individual strain sensors and the actual local pressing load values at the respective pressing portions of the press which correspond to the respective frame members. In operation of the press, the converting means converts the level of the output signal of each strain sensor into the corresponding actual local pressing load value according to one of the stored relationships which corresponds to the strain sensor in question. The actual total pressing load value is calculated by suitable calculating means by summing up the actual local pressing load values obtained by the converting means on the basis of the output signals of the individual strain sensors and according to the stored relationships. This arrangement allows accurate measurement of not only the total pressing load value but also the local pressing load values at the respective pressing portions of the press, such as the corner portions of the press slide. Consequently, the forces which act on the workpiece at different local portions thereof through a pressure ring to hold the workpiece may be precisely detected, together with the local press forming forces (e.g., drawing forces) which act on the workpiece through the die set. The precise detection or measurement of the workpiece holding forces and the local press forming forces assure efficient and accurate adjustment of the die set when the die set is initially used on the press.

The second object indicated above may be achieved according to a second aspect of this invention, which provides a method of adjusting local pressing load values on a press having a press slide which is connected to a reciprocating member of a drive mechanism through a plurality of fluid-actuated cylinders and which is vertically reciprocated by the reciprocating member, the local pressing load values acting on the press slide at respective local portions thereof through the fluid-actuated cylinders, respectively, when a pressing operation on a workpiece is performed by a reciprocating action of the press slide with an upper die attached thereto, the method comprising the steps of: measuring the actual local pressing load values at the local portions of the press slide corresponding to the plurality of fluid-actuated cylinders; and adjusting pressure values of a fluid in the plurality of fluid-actuated cylinders independently of each other so that the measured actual local pressing load values at the local portions of the press slide substantially coincide with respective predetermined optimum values.

In the press wherein the local pressing load values act on the local portion of the press slide through the respective fluid-actuated cylinders, the characteristic of the pressing load value at each local portion of the press slide in relation to a change in the effective pressing stroke of the slide can be changed by adjusting the fluid pressure in the corresponding fluid-actuated cylinder. Accordingly, the adjustment of the fluid pressures in the individual fluid-actuated cylinders independently of each other makes it possible to adjust the local pressing load values at the respective local portions of the press slide independently of each other, namely, adjust the distribution of the local pressing load values as needed. More specifically, the desired distribution of the local pressing load values can be easily reproduced on the press, by adjusting the fluid pressures in the fluid-actuated cylinders independently of each other so that the actual local pressing load values as detected by suitable means is substantially equal to the respective predetermined optimum values. The independent adjustment of the fluid pressures in the individual cylinders accommodates a variation in the characteristics of the press from one machine to another, thereby assuring the optimum or desired distribution of the local pressing load values which allows consistently highly quality of the articles produced by the press. Further, the easy reproduction of the local load distribution on the press slide leads to considerable reduction in the time and the operator's efforts required for adjustment of the die set, and significant improvement of the operating efficiency of the press.

BRIEF DESCRIPTION OF THE DRAWINGS

The above and optional objects, features and advantages of the present invention will become more apparent from the following detailed description of presently preferred embodiments of the invention, when considered in conjunction with the accompanying drawings, in which:

FIGS. 12(a), 12(b) and 13 are flow charts illustrating a routine for adjusting a relative distance h1 and hydraulic pressure Pa of the die-height adjusting mechanism of FIG. 2, according to a predetermined optimum pressing force;

FIG. 17(a) and 17(b) are a flow chart illustrating a routine used in place of the routine of FIG. 12 in another embodiment of this invention;

DETAILED DESCRIPTION OF THE PREFERRED EMBODIMENTS

Figure 1:
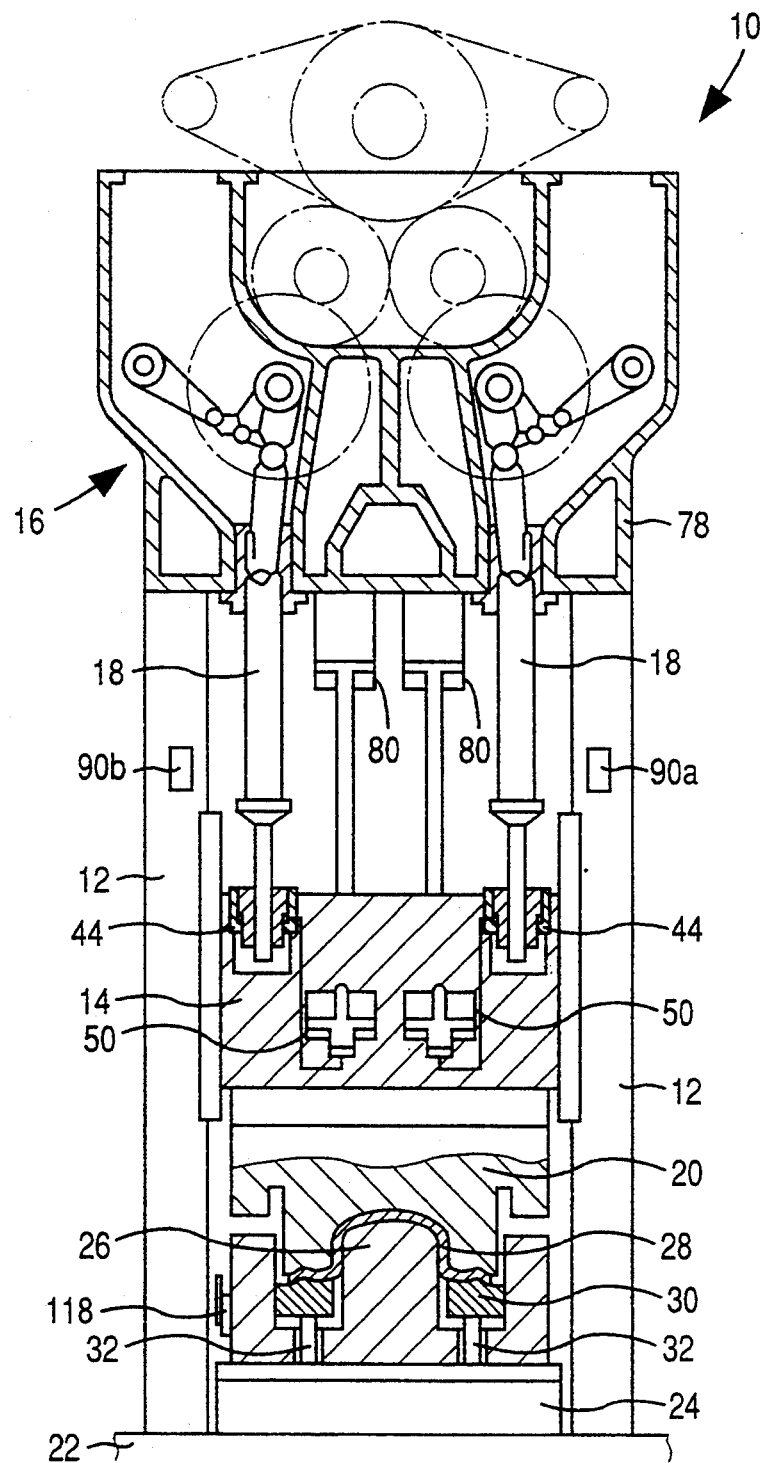
FIG. 1 is a schematic elevational view partly in cross section of an example of a single-action press wherein local pressing load values are automatically measured and adjusted according to one embodiment of the present invention.

Referring first to FIG. 1, one example of a single-action press is shown generally at 10. The press 10 is adapted to effect a drawing operation on a blank in the form of a metal sheet 28. The press 10 has four frame members 12 extending upright from four corners of a press bed 22, so as to support a drive mechanism 16 for reciprocating a press slide 14 in the vertical direction. The drive mechanism 16 includes an electric motor, a gear train, links and crankshafts, as well known in the art, for synchronously reciprocating four plungers 18, which extend from the lower end of the mechanism 16 so as to be disposed inside the frame members 12. The plungers 18 are connected at their lower ends with respective four corner portions of the press slide 14.

The press slide 14 carries an upper die 20 fixed to its underside, while a lower die in the form of a punch 26 is mounted on a bolster 24 which rests on the base 22. With the press slide 14 lowered by the drive mechanism 16 through the plungers 18, the metal sheet 28 is drawn by cooperative actions of the upper and lower dies 20, 26. The punch 26 is provided with a pressure ring 30 which is supported vertically movably by a multiplicity of cushion pins 32 biased by a cushioning pneumatic cylinder as well known in the art. The cushion pins 32 supporting the pressure ring 30 at their upper ends may be moved downward against a biasing action of the cushioning pneumatic cylinder. When the upper die 20 is lowered for drawing the metal sheet 28, the pressure ring 30 cooperates with the upper die 20 to hold the metal sheet 28 at an outer portion of the sheet 28. It will be understood that the plungers 18 act as reciprocating members for reciprocating the press slide 14, and that the upper die 20, punch 26 and pressure ring 30 constitute a die set (20, 26, 30) used for the specific blank 28.

Figure 2:
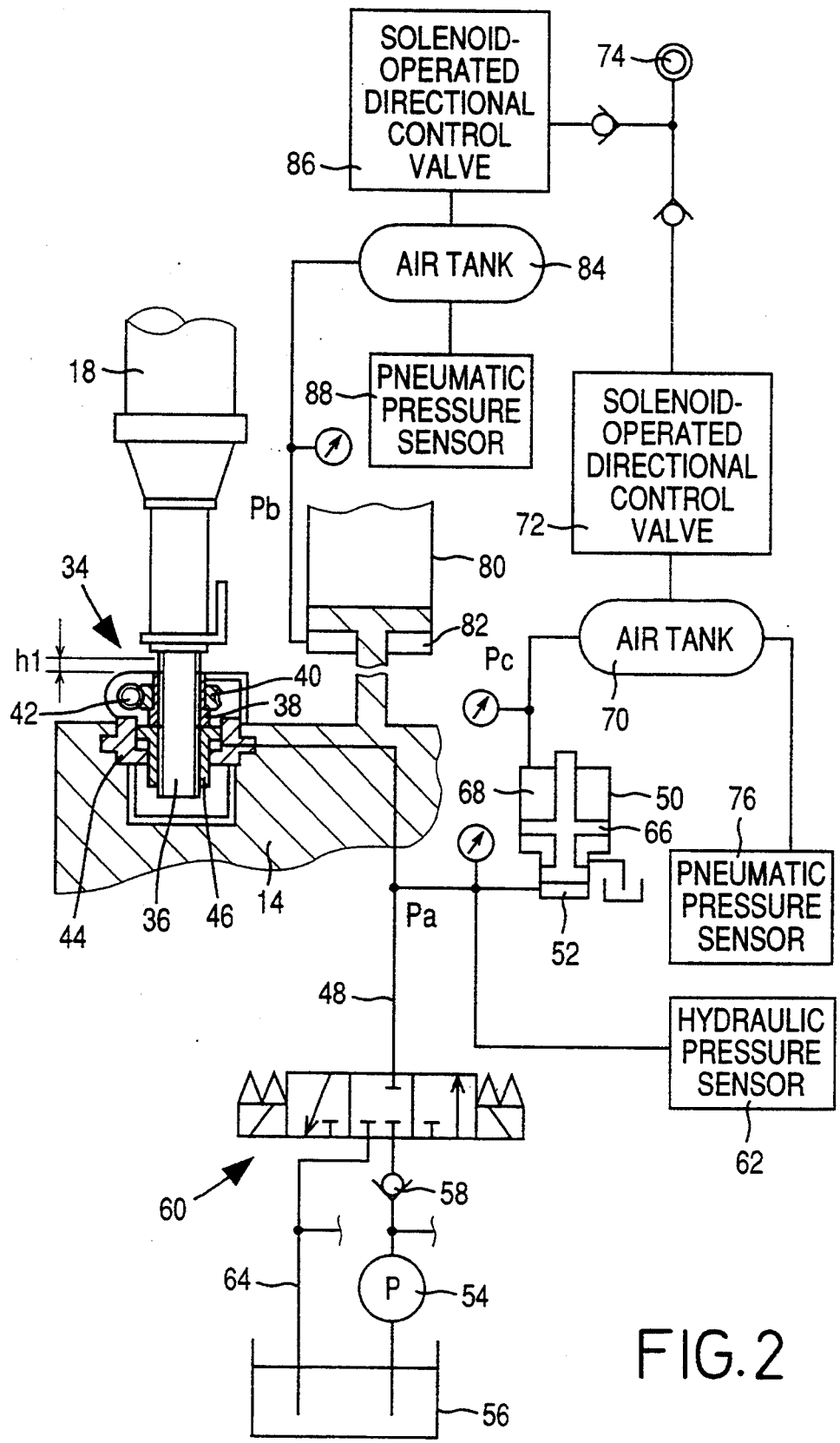
FIG. 2 is a schematic elevational view partly in cross section showing a die-height adjusting mechanism provided between a press slide and each plunger of a slide drive system, and the related components of the press of FIG. 1.

The press slide 14 has a substantially rectangular upper surface, and the four plungers 18 are connected to the respective four corner portions (front left and right, and rear left and right corner portions) of the press slide 14 through respective four die-height adjusting mechanisms 34 as shown in FIG. 2. Each die-height adjusting mechanism 34 includes a threaded shaft 36 which is formed integrally with the corresponding plunger 18 so as to extend from the lower end of the plunger 18. The mechanism 34 further includes a nut 38 engaging the threaded shaft 36, a worm wheel 40 fixed to the nut 38, and a worm 42 meshing with the worm wheel 40. The worms 42 of the four die-height adjusting mechanisms 34 are rotated bidirectionally by a common servomotor 43 (FIG. 4), so that the worm wheels 40 and nuts 38 are rotated clockwise or counterclockwise to thereby adjust the initial height of the press slide 14, namely, the initial height of the upper die 20. More specifically, Each die-height adjusting mechanisms 34 and the servomotor 43 permit adjustment of a relative distances h1 between the corresponding plunger 18 and the corresponding die-height adjusting mechanism 34. An increase in this relative distance h1 results in lowering the initial height of the press slide 14 away from the plunger 18. The initial height of the press slide 14 determines the effective drawing stroke of the press slide 14, which is a distance between the point of contact of the upper die 20 with the blank 28 on the lower die 26, and the lower stroke end of the press slide 14. Accordingly, a local pressing force or load Fpi which acts on each corner portion of the slide 14 at its lower stroke end increases with an increase in the relative distance h1.

The press slide 14 incorporates four fluid-actuated cylinders in the form of four overload-protective hydraulic cylinders 44. Each hydraulic cylinder 44 has a housing fixed to the corresponding corner portion of the press slide 14, and a piston 46 fixed to the corresponding die-height adjusting mechanism 34. An axial movement of the piston 46 changes the relative position of the plunger 18 and the press slide 14. The overload-protective hydraulic cylinder 44 has a fluid chamber filled with a working fluid and communicating with an oil chamber 52 of a hydro-pneumatic cylinder 50 through a fluid passage 48.

The fluid passage 48 is also connected to an electrically operated pump 54 through a check valve 58 and pressure control means in the form of a solenoid-operated directional control valve 60. The working fluid in a reservoir 56 is pressurized by the pump 54, and the pressurized fluid is fed to the fluid chamber of the hydraulic cylinder 44 through the valves 58, 60. A hydraulic pressure sensor 62 is provided to detect hydraulic pressure Pa in the fluid passage 48 (pressure in the hydraulic cylinder 44 and the oil chamber 52 of the hydro-pneumatic cylinder 50). The solenoid-operated directional control valve 60 provided for each of the four hydraulic cylinders 44 has a first position for disconnecting the fluid passage 48 from the pump 58, a second position for connecting the fluid passage 48 to the pump 58, and a third position for connecting the fluid passage 48 to a drain line 64. The four valves 60 for the four overload-protective hydraulic cylinders 44 are controlled by electric signals from a controller 92 (which will be described by reference to FIG. 4), so that the hydraulic pressure values Pa in the corresponding hydraulic cylinders 44 are regulated independently of each other. It is noted that the pump 54 is used for all of the four hydraulic cylinders 44.

The hydro-pneumatic cylinder 50 also has an air chamber 68 separated by a piston 66 from the oil chamber 52 indicated above. The air chamber 68 communicates with an air tank 70 connected to an air source 74 through a solenoid-operated directional control valve 72, so that a pneumatic pressure Pc within the air chamber 68 and air tank 70 is regulated to an optimum level by the directional control valve 72, according to a signal from the controller 92. The control valve 72 has the same function as the valve 60, except in that the pneumatic pressure Pc rather than the hydraulic pressure Pa is controlled by the valve 72. The pneumatic pressure Pc, which is detected by a pneumatic pressure sensor 76, is adjusted depending upon the pressing capacity of the press 10. That is, the pneumatic pressure Pc is determined so that when an excessive load acts on the overload-protective hydraulic cylinder 44, the piston 66 of the hydro-pneumatic cylinder 50 is moved toward the air chamber 68, so as to permit a movement of the piston 46 and movements of the plunger 18 and the press slide 14 toward each other, for thereby protecting the press 10 and the dies 20, 26 against damage due to an overload. The hydro-pneumatic cylinders 50, air tank 70, directional control valve 72, etc. are provided for each of the four plungers 18 (for each of the four die-height adjusting mechanisms 34). The pneumatic pressure values Pc in the four air tanks 70 are suitably regulated independently of each other, so as to accommodate possible variations in the pressure-receiving areas of the pistons 46, 66 of the four cylinders 44, 50. The air chamber 68 whose pressure Pc is regulated as described above may be replaced by a compression coil spring which biases the piston 66. In this case, the biasing force of the coil spring is regulated by suitable means.

As shown in FIGS. 1 and 2, the press slide 14 is also connected to the pistons of four counterbalancing pneumatic cylinders 80 attached to a housing 78 of the drive mechanism 16, as shown in FIG. 1. Each cylinder 80 has an air chamber 82 communicating with an air tank 84, which is also connected to the air source 74 through a solenoid-operated directional control valve 86. With this control valve 86 suitably controlled by the controller 92, a pneumatic pressure Pb within the air chamber 82 and the air tank 84 is adjusted to an optimum level, so that the sum of the pneumatic pressure values Pb of the four counterbalancing pneumatic cylinders 80 is equal to the total weight of the press slide 14 and the upper die 20. The control valve 86 has the same function as the control valve 72. The pneumatic pressure Pb is detected by a pneumatic pressure sensor 88. It is noted that the air chambers 82 of all the four pneumatic cylinders 80 are connected to the single common air tank 84.

Figure 3:
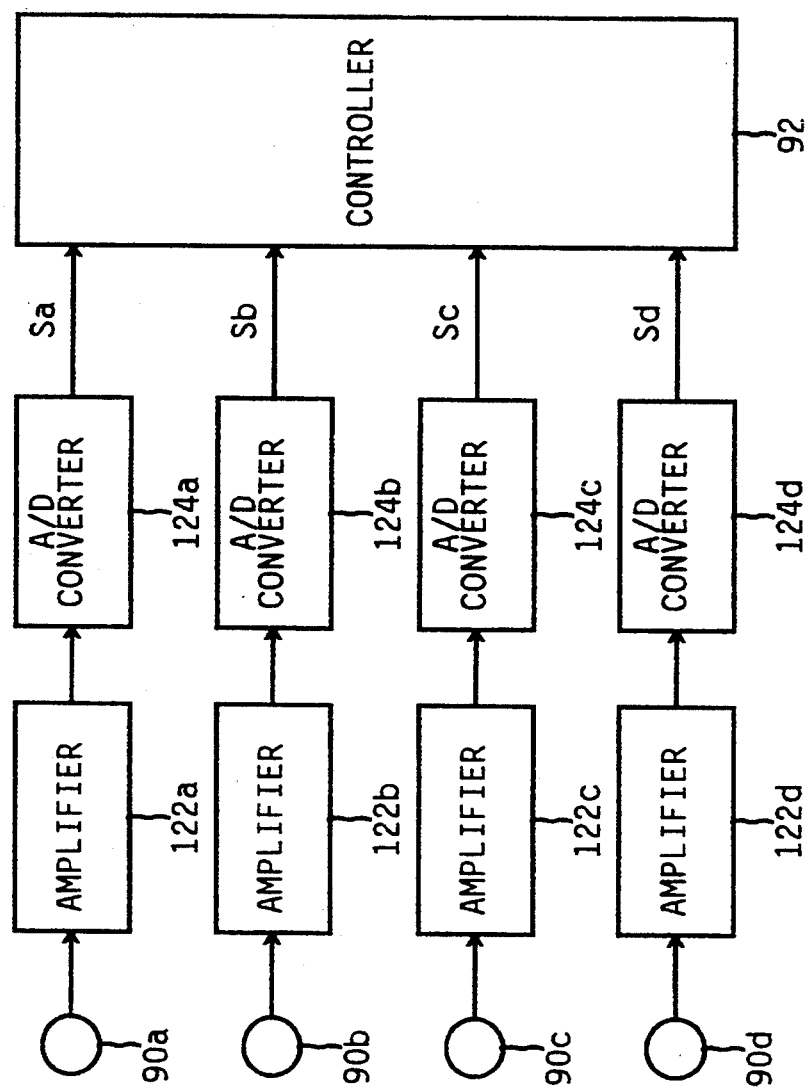
FIG. 3 is a block diagram illustrating a circuit for processing signals produced by strain gages provided on the press.

Each of the four frame members 12 has a strain sensor in the form of four strain gages $90i$ ($i=a, b, c, d$) which are connected to each other so as to form a bridge circuit. As shown in FIG. 3, the four sets of strain gages $90i$ are connected to the controller 92 through respective four amplifiers $122i$ ($i=a, b, c, d$) and four A/D converters $124i$ ($i=a, b, c, d$). The controller 92 receives from the A/D converters $124i$ STRAIN signals $Si$ ($i=a, b, c, d$) which represent the amounts of strain in the form of elongation of the respective four frame members 12. Namely, the frame members 12 are more or less elongated when the blank 28 is subjected to a drawing operation by the upper and lower dies 20, 26 under a certain pressing or drawing force. The amplifiers $122i$ have respective amplification coefficients.

Figure 4:
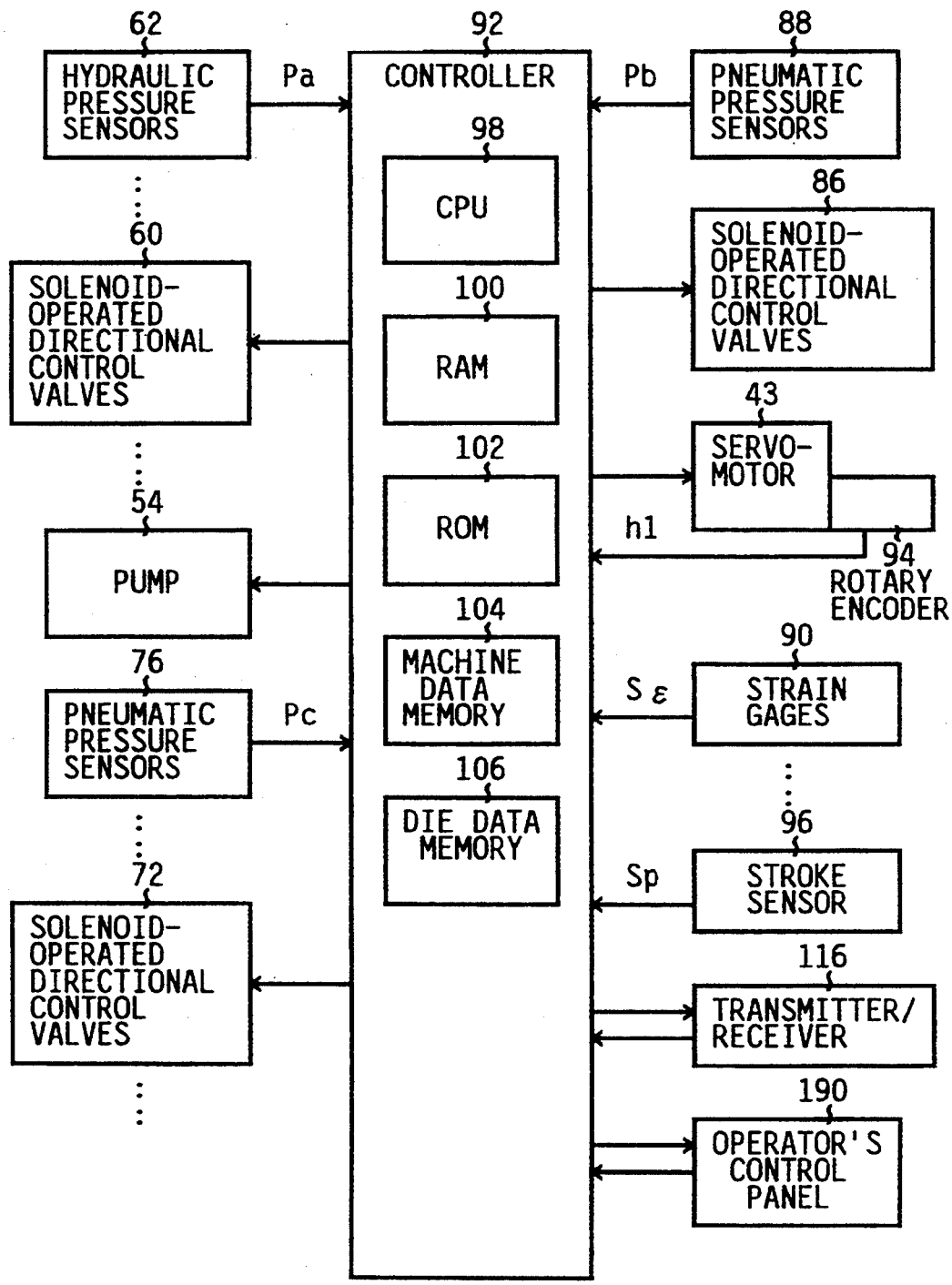
FIG. 4 is a block diagram showing a control system for controlling the press of FIG. 1.

Referring to the block diagram of FIG. 4, the controller 92 for controlling the press 10 is adapted to receive the output signals of the hydraulic pressure sensor 62, pneumatic pressure sensors 76, 88 and a rotary encoder 94 attached to the servomotor 43, and the output signals $Si$ of the A/D converters $124i$ (strain gages $90i$). As is apparent from the above description, the output signals of the sensors 62, 76, 88 represent the hydraulic and pneumatic pressures Pa, Pc, Pb, respectively, and the output signal of the rotary encoder 94 represents the relative distance h1 between the plunger 18 and the die-height adjusting mechanism 34. The controller 92 also receives an output signal of a stroke sensor 96 (also shown in FIG. 4) in the form of a STROKE signal Sp representative of the operating stroke of the press slide 14. The stroke sensor 96 may be an encoder adapted to detect the rotating angle of a crankshaft of the drive mechanism 16.

The controller 92 is constituted by a microcomputer including a central processing unit (CPU) 98, a random-access memory (RAM) 100, a read-only memory (ROM) 102, a machine data memory 104, a die data memory 106, and input and output interface circuits. The CPU 98 operates to execute various routines according to control programs stored in the ROM 102 while utilizing a temporary data storage function of the RAM 100, and produce control or drive signals for controlling the directional control valves 60, 72, 86, pump 54 and servomotor 43.

The machine data memory 106 stores machine information received from an input device such as a keyboard or an external computer. The machine information represent specifications and characteristics of the press 10, which include: weight Ws of the press slide 14; pressure-receiving area Ab of the pneumatic cylinders 80; optimum overload-protective values Pco of the pneumatic pressure Pc in the air chambers 68 of the hydro-pneumatic cylinders 50; and relationships between the levels of the STRAIN signals Si and the actual local pressing load values Fpi of the press 10. The pressure-receiving area Ab is a sum of the pressure-receiving areas of the four pneumatic cylinders 80, which is determined by experiments or simulation so as to provide an optimum force for counterbalancing the press slide 14, in view of the air leakage associated with the cylinders 80, sliding resistance of the press slide 14 and other parameters. The optimum pneumatic pressure values Pco of the four cylinders 50 are determined by experiments or simulation so as to permit the pistons 66 to move toward the air chambers 68 when the load acting on the press slide 14 exceeds a predetermined threshold.

Figure 5:
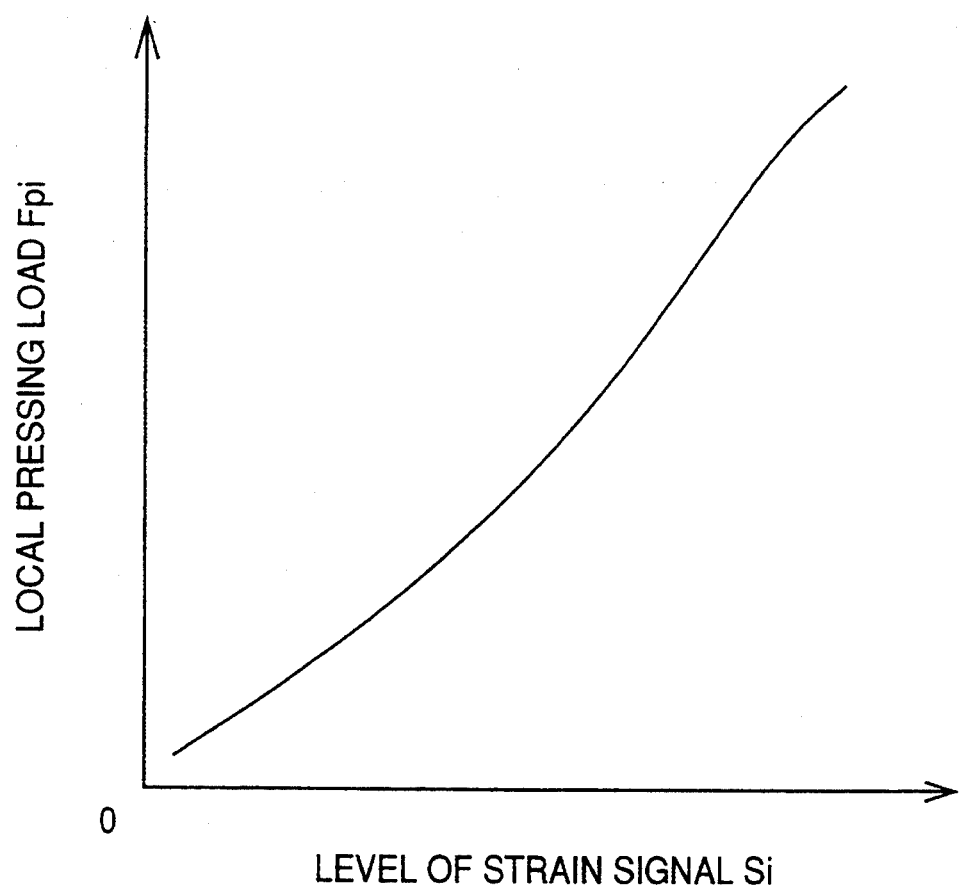
FIG. 5 is a graph indicating an example of a relationship between a local pressing load Fpi and the level of a strain signal Si produced by a strain gage, which relationship is represented by a data map stored in a machine data memory provided in the control system of FIG. 4.

The relationships between the levels of the STRAIN signals Si (i=a, b, c, d) and the local pressing load values Fpi (i=a, b, c, d) are obtained for all of the four frame members 12, in the manner as-described below. An example of these Si-Fpi relationships is illustrated in the graph of FIG. 5. The controller 92 is adapted to convert the received STRAIN signals Si into local load values Fpi, according to the Si-Fpi relationships represented by data maps stored in the machine data memory 104. Thus, the actual local load values Fpi corresponding to the four frame members 12 can be accurately detected based on the STRAIN signals Si obtained from the outputs of the strain gages 90i and according to the known Si-Fpi relationships. The four local load values Fpi are summed up to obtain a total pressing load Fpt of the press 10.

Figure 6:
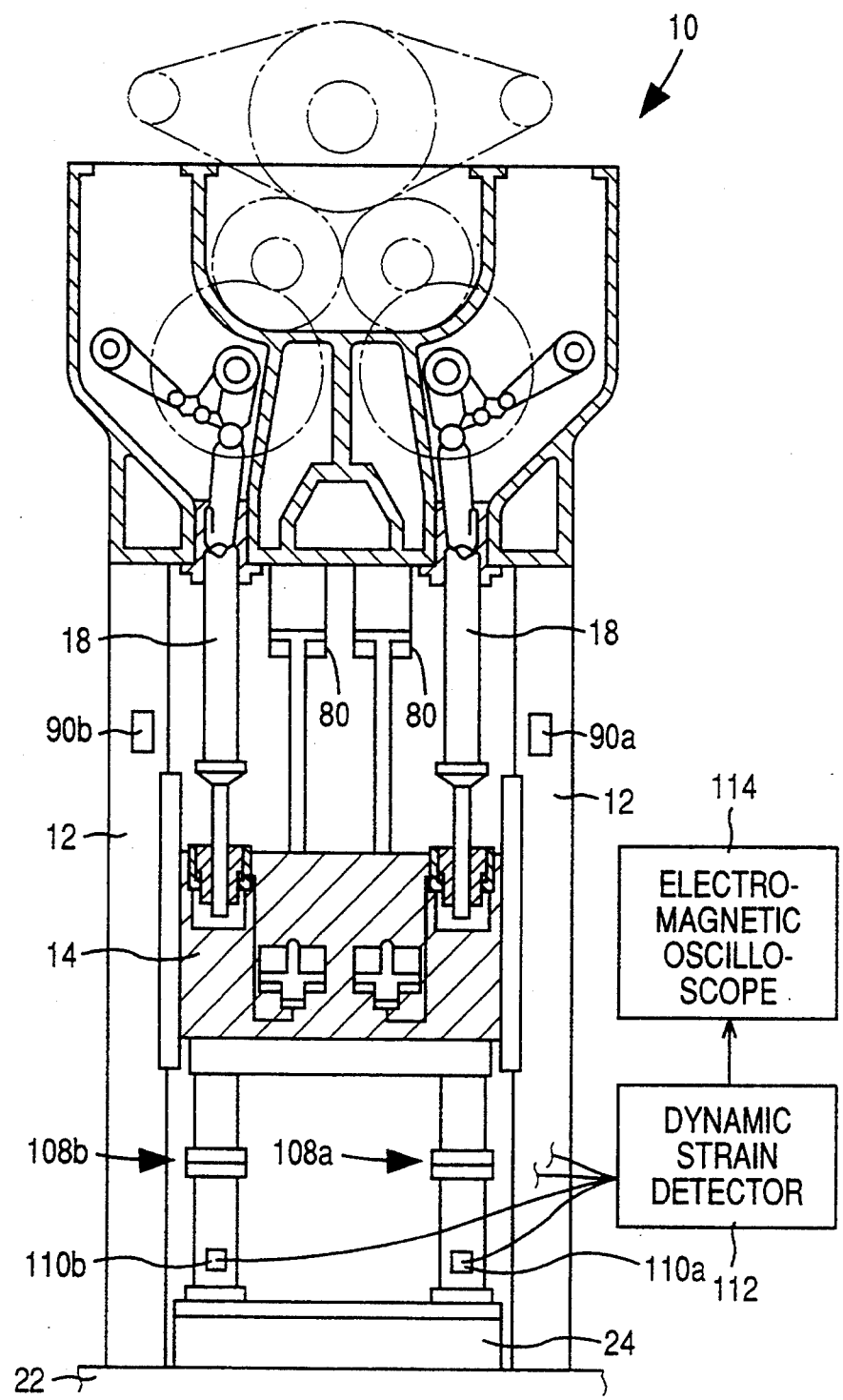
FIG. 6 is a schematic elevational view showing the press of FIG. 1 as equipped with load measuring devices for measuring actual local pressing load values on the press.
Figure 7:
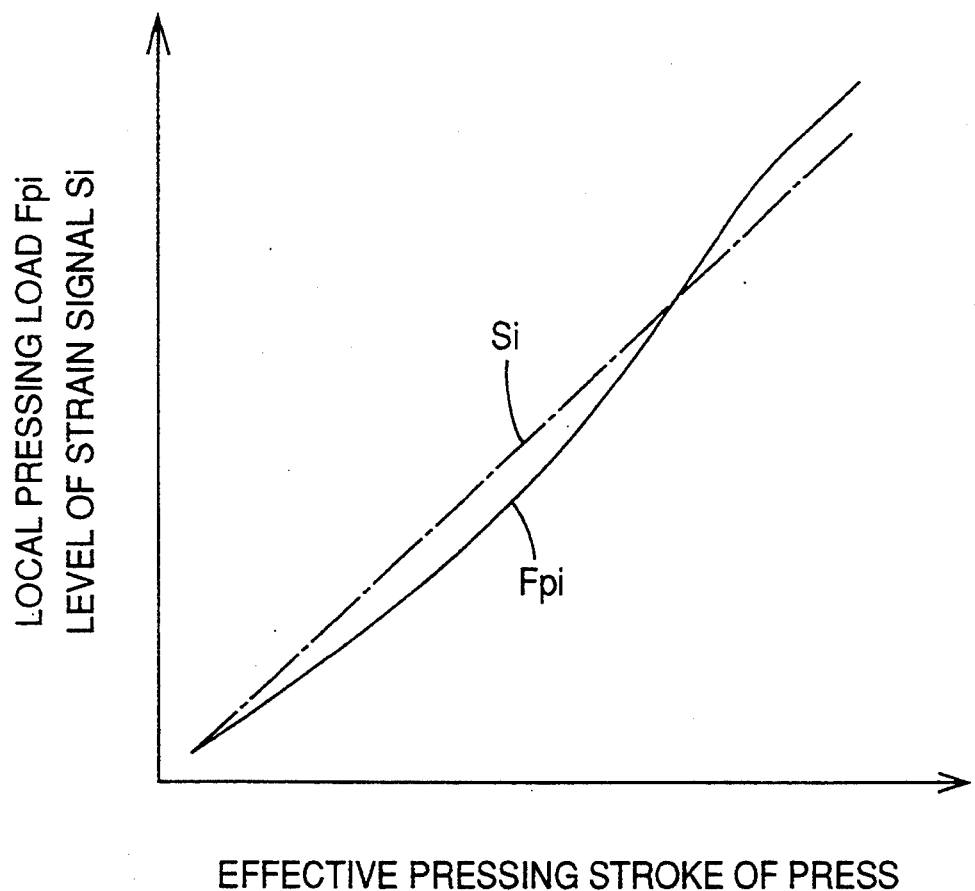
FIG. 7 is a graph indicating examples of the level of the strain signal Si and the local pressing load value Fpi, which are actually detected on the press of FIG. 6 and which vary with the effective drawing stroke of the press slide.

The Si-Fpi relationships as illustrated in FIG. 5 may be obtained by actually detecting the levels of the STRAIN signals Si based on the output signals of the strain gages 90i on the four frame members 12, and by actually measuring the local load values Fpi using four load measuring devices 108i (i=a, b, c, d) which are disposed on the bolster 24, as shown in FIG. 6. These four load measuring devices 108i are set on the bolster 24, without the upper and lower dies 20, 26 mounted on the press 10, such that the four load measuring devices 108i are aligned with or located right below the respective four plungers 18. Each load measuring device 108i is provided with a strain sensor 110i (i=a, b, c, d) which is connected to an electromagnetic oscilloscope 114 through a dynamic strain detector 112. The strain sensor 110i on each measuring device 108i consists of four strain gages connected to form a bridge circuit. The dynamic strain detector 112 has a function of an amplifier, and is capable of adjusting a zero point thereof. The electromagnetic oscilloscope 114 is capable of recording on a recording medium, with high response, the local load values Fpi which vary as the press slide 14 is reciprocated. The press slide 14 is reciprocated with different effective drawing strokes of the press slide 14. The effective drawing stroke of the slide 14 can be changed by changing the initial height of the slide 14, that is, by operating the die-height adjusting mechanisms 34 so as to change the relative distance h1 with respect to the plungers 18. The curves in FIG. 7 represent the maximum values of the level of the STRAIN signal Si (output signals of the strain gages 90i) detected by the controller 92, and the maximum values of the local pressing load Fpi detected by the oscilloscope 114, in relation to the varying effective drawing stroke of the press slide 14. Thus, the Si-Fpi relationship as shown in FIG. 5 between the actual level of the STRAIN signal Si and the actual local pressing load Fpi can be obtained based on the thus obtained curves Si, Fpi of FIG. 7, for each of the four frame members 12, that is, for each of the four corner portions of the press slide 14.

Each of the load measuring devices 108i uses a combination of two height blocks which have height dimensions substantially equal to those of the upper and lower dies 20, 26. Where the press 10 uses various sets of the upper and lower dies 20, 26 which have different total height dimensions, different combinations of the height blocks having different total height dimensions are necessary for the load measuring devices 108i.

Figure 8:
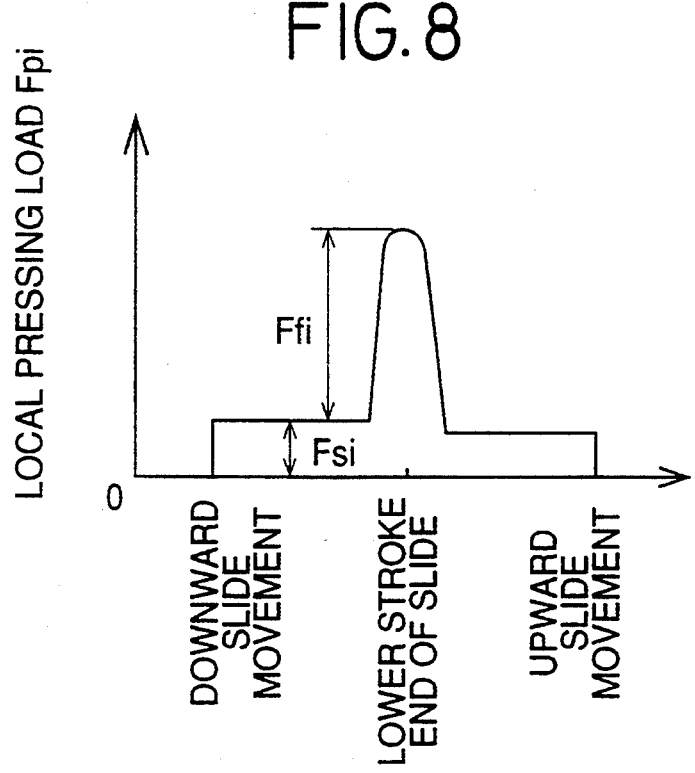
FIG. 8 is a graph showing an example of a waveform of the local pressing load value Fpi detected by a strain gage on the press of FIG. 1, which value Fpi consists of a local blank holding force Fsi and a local drawing force Ffi.

Referring back to the block diagram of FIG. 4, the CPU 98 of the controller 92 calculates the local load values Fpi based on the levels of the STRAIN signals Si received from the respective A/D converters 124i (FIG. 3), and according to the Si-Fpi relationships represented by the data maps stored in the machine data memory 104. Each local pressing load value Fpi consists of a holding force Fsi applied to the blank 28 through the pressure ring 30, and a drawing force Ffi which varies as the press slide 14 is moved to and from its lower stroke end, as indicated in the graph of FIG. 8. Since the local pressing load value Fpi varies during a pressing cycle as indicated in FIG. 8, the holding force component Fsi and the drawing force component Ffi of the load value Fpi can be obtained. The holding force values Fsi corresponding to the four corner portions of the slide 14 is summed up to obtain a total holding force Fs, and the drawing force values Ffi corresponding to the four corner portions of the slide 14 is summed up to obtain a total drawing force Ff. The total holding and drawing forces Fs and Ff are summed up to obtain the total pressing force Fpt of the press 10. The controller 92 commands an operator's control panel 190 to display the obtained local holding force values Fsi and local drawing force values Ffi, total holding force Fs and total drawing force Ff, and total pressing force Fpt.

In the press 10 according to the present embodiment arranged as described above, the relationships between the actual local pressing load values Fpi at the four frame members 12 and the actual levels of the corresponding STRAIN signals Si are obtained prior to a production run of the press 10, and the data maps representative of the obtained Si-Fpi relationships are stored in the machine data memory 104, so that the local pressing load values Fpi during an actual pressing or drawing operation on the blank 28 are calculated based on the detected levels of the STRAIN signals Si and according to the thus stored Si-Fpi relationships. Thus, the local holding force values Fsi, local drawing force values Ffi, total holding force Fs, total drawing force Ff, and total pressing force Fpt can be detected with sufficiently high accuracy, on the basis of the STRAIN signals Si. Accordingly, it is possible to adjust and monitor the pressing force or load with high precision, for thereby significantly reducing the defect or reject ratio of the articles formed from the blank 28.

Since the local holding force values Fsi and the local drawing force values Ffi as well as the total holding and drawing force values Fs, Ff and the total pressing force Fpt can be detected with high accuracy, the load distribution of the press slide 14 can be intricately adjusted or monitored for assuring a high-precision drawing operation on the present press 10. When the press 10 is used as a test press for adjusting the dies 20, 26, the use of the local holding and drawing force values Fsi, Ffi permits fine and intricate adjustment of the dies.

The die data memory 106 is provided to store die set information received from an ID card 118 (FIG. 1) through a transmitter/receiver 116 (FIG. 4). The ID card 118 is attached to the lower die or punch 26, and has a memory storing information such as: optimum local drawing force values Ffoi (i=a, b, c, d) for assuring intended quality of the drawn articles; weight Wu of the upper die 20; and thickness t of the blank 28. The ID card 118 also has a battery, and a transmitter/receiver for transmitting the die set information to the transmitter/receiver 116 when a suitable signal is received from the transmitter/receiver 116. The optimum local drawing force values Ffoi correspond to the four corner portions of the press slide 14. These optimum local drawing force values Ffoi are determined by a test operation on a test press similar to the press 10, so that the optimum local drawing force values Ffoi assure an intended drawing operation on the press 10 to provide high-quality products (drawn articles). As indicated in the graph of FIG. 8, the local pressing force Fpi as detected by the strain gages 90i varies during a reciprocating stroke of the press slide 14. The local holding force Fsi and the local drawing force Ffi can be determined based on the waveform of the local pressing force Fpi. The optimum local drawing force values Ffoi stored in the ID card 118 are the drawing force values Ffi which permit the intended drawing operation. As indicated above, the drawing force Ff is a load applied to the blank 28 from the upper and lower dies 20, 26, while the holding force Fs is a load applied to the pressure ring 30 (blank 28) from the cushioning air cylinder through the cushion pins 32. In other words, the drawing force Ff is a force by which the upper and lower dies 20, 26 are pressed against each other, while the holding force Fs is a force by which the upper die 20 and the pressure ring 30 are pressed against each other through the blank 28.

Figure 9:
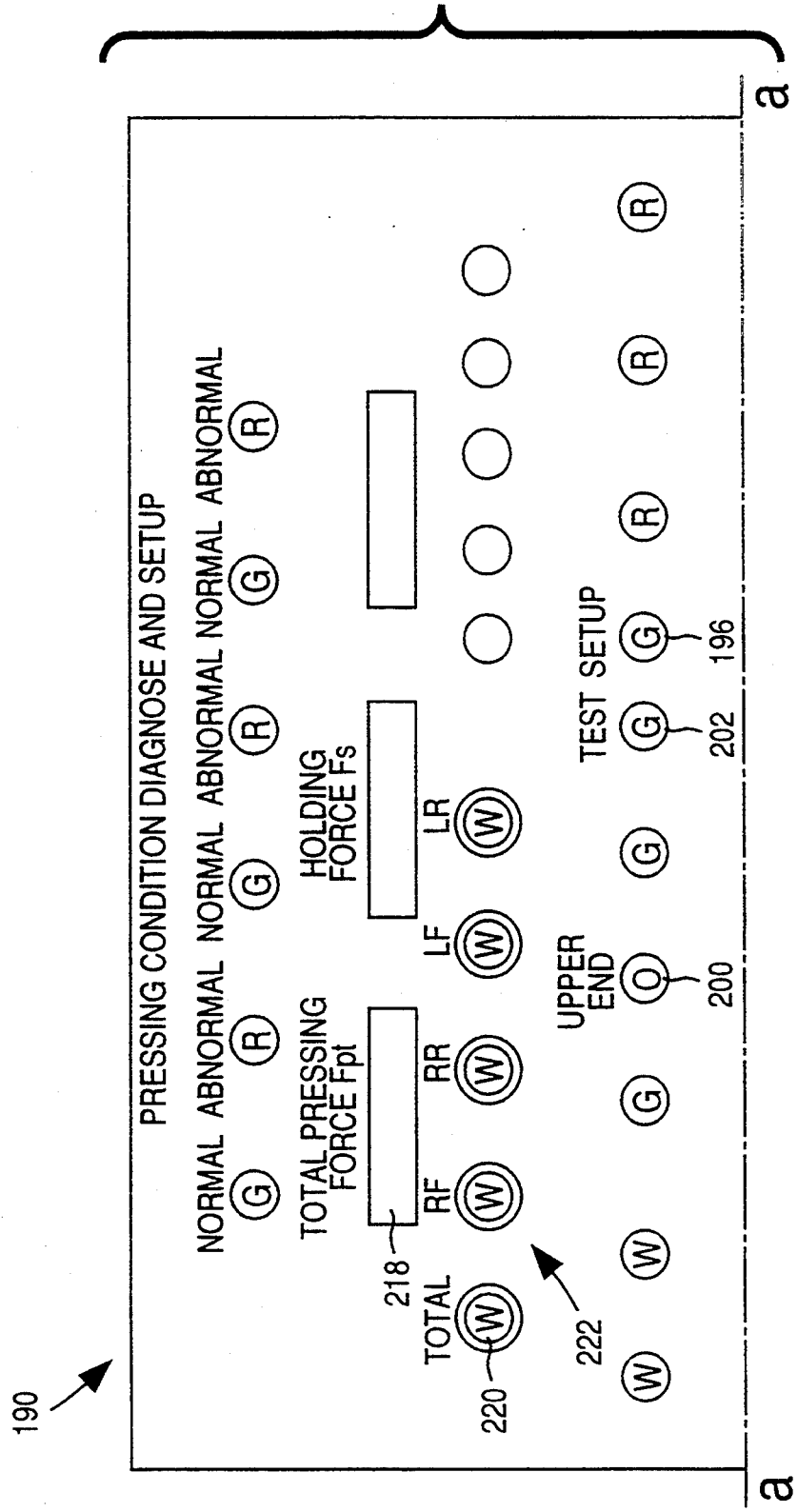
FIGS. 9–11 are views showing an operator's control panel provided on the press of FIG. 1.
Figure 10:
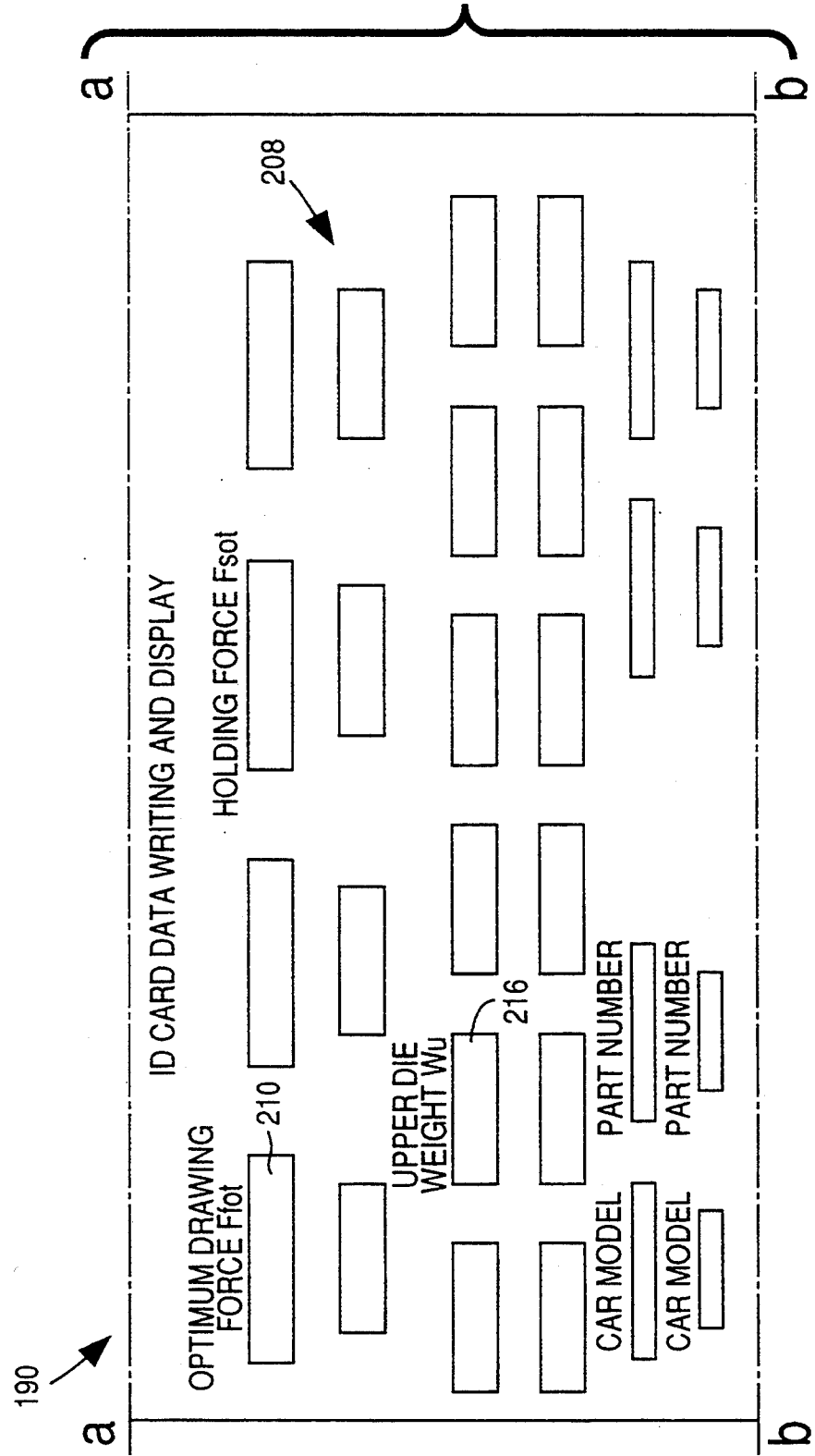
Figure 11:
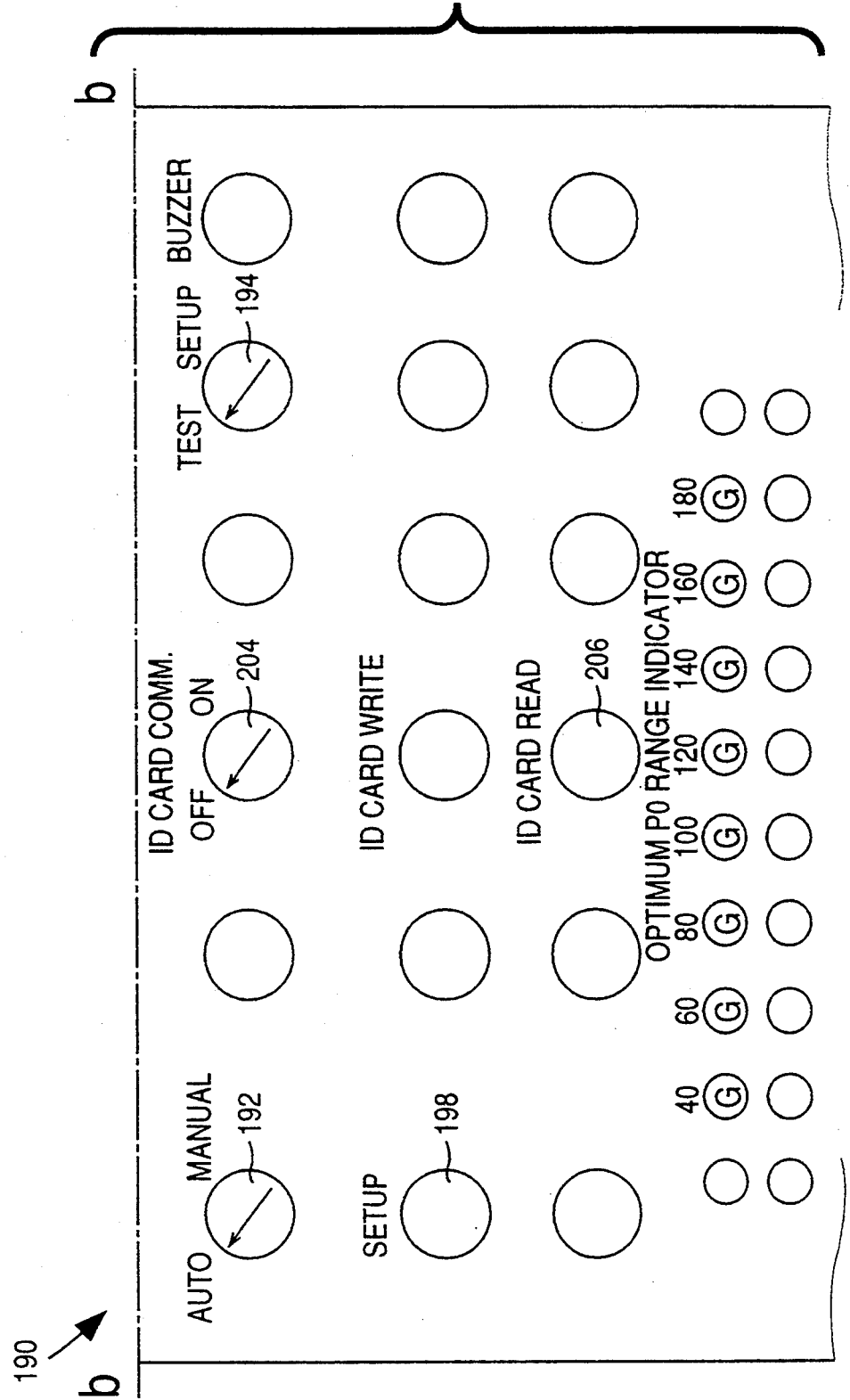
Figure 12A:
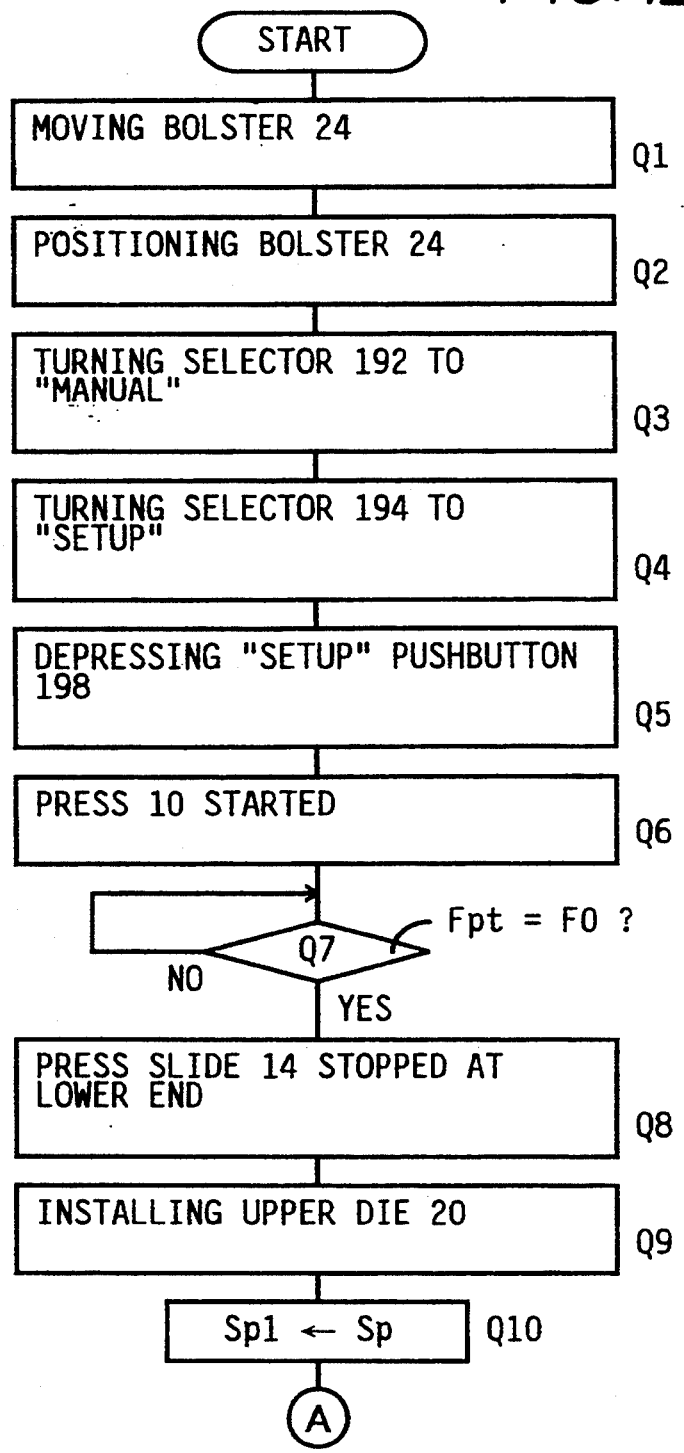

Referring to FIGS. 9–11, the operator's control panel 190 connected to the controller 92 permits the operator or user of the press 10 to manually adjust the relative distance h1 (FIG. 2) and the hydraulic pressure values Pa in the four overload-protective hydraulic cylinders 44. The adjustment of these parameters h1 and Pa may be achieved according to a routine illustrated in the flow chart of FIGS. 12(a), 12(b) and 13, which show manual operations on the operator's control panel 190 by the operator, as well as operations performed by the controller 92.

Initially in step Q1, the bolster 24 on which the die set (20, 26, 30) is placed is moved onto the press 10, by operating suitable switches on the operator's control panel 190. In the next step Q2, the bolster 24 is automatically positioned in place for pressing operation. In the next step Q3, an AUTO-MANUAL selector 192 (FIG. 11) is turned to "MANUAL". Step Q3 is followed by step Q4 in which a TEST-SETUP selector 194 (FIG. 11) is turned to "SETUP", whereby a SETUP light 196 (FIG. 9) is turned on. Then, a SETUP pushbutton 198 (FIG. 11) is pressed in step Q5, and a suitable switch on the panel 190 is turned on to operate the press 10 in an inching mode. Before this inching mode of operation, the pneumatic pressure Pb of the counterbalancing pneumatic cylinders 80 has been automatically adjusted to a level almost equal to Ws/Ab, where Ws represents the weight of the press slide 14 while Ab represents the total pressure-receiving area of the cylinders 80. The values Ws and Ab are stored in the machine data memory 104 as explained above. Further, the pneumatic pressure Pc of the four hydro-pneumatic cylinders 50 has been automatically adjusted to be substantially equal to the optimum value Pco also stored in the machine data memory 104. These pressure values Pb, Pc may be manually adjusted by the operator with suitable manual control valves while observing appropriate pressure gages.

The control flow then goes to step Q7 to determine whether the total pressing force Fpt obtained from the STRAIN signals Si and the Si-Fpi relationships has reached a predetermined optimum initial value Fo during a downward movement of the press slide 14. When the pressing force Fpt has become equal to the value Fo, step S8 is implemented to stop the downward movement of the slide 14. The predetermined optimum initial value Fo ranges from several tons to several tens of tons, for example, and is determined so as to prevent an overload of the motor of the driving mechanism 16. The automatic stopping of the downward movement of the slide 14 when the pressing force Fpt reaches the predetermined optimum initial value Fo is effected in step Q8 since the TEST-SETUP selector 194 is placed in the SETUP position. In the next step Q9, the upper die 20 is fixed to the press slide 14, by automatic activation of a clamping device on the slide 14. However, the die 20 may be manually installed on the slide 14 by the operator, using bolts or other fastening means. Step Q9 is followed by step Q10 in which an operating stroke Sp of the slide 14 from its initial height to the point at which the pressing force Fpt has reached the predetermined value Fo is stored as Sp1 in the RAM 100. As indicated in FIG. 12(b), step Q11 is then implemented to move the press slide 14 upward by an appropriate switch on the panel 190. In step Q12, the upper stroke end or initial height position of the slide 14 is detected by the stroke sensor 96, and an UPPER END light 200 (FIG. 9) is turned on. Thus, the setup operation is completed.

In the next step Q13, the TEST-SETUP selector 194 is turned to "TEST", whereby a TEST light 202 (FIG. 9) is turned on. Step Q13 is followed by step Q14 in which a distance $\Delta Sp$ between the lower stroke end of the slide 14 and the point at which Fpt=Fo (the position of the slide 14 at which the die 20 was fixed to the slide 14 in step Q9) is calculated from the stored stroke value Sp1. Then, in the same step Q13, an adjusting amount $\Delta h$ of the relative distance h1 is calculated according to the following equation (1), on the basis of the calculated distance $\Delta Sp$, the thickness t of the blank 28 stored in the machine data memory 104, and a predetermined additional distance x0.

$$\Delta h = -\Delta Sp - t + x0 \tag{1}$$

The servomotor 43 is operated to adjust or change the distance h1 by the calculated adjusting amount $\Delta h$. The subtraction or minus sign of the distance $\Delta Sp$ in the equation (1) assures the total pressing force Fpt to be equal to the optimum initial value Fo at the lower stroke end of the slide 14. The subtraction or minus sign of the thickness t of the blank 28 assures the optimum initial total pressing force Fo at the lower stroke end of the slide 4 in a production run with the blank 28 loaded on the press 0. The addition or plus sign of the additional distance x0 in the equation (1) results in lowering the lower stroke end and increasing the effective drawing stroke by x0. Accordingly, the adjustment of the relative distance h1 by the calculated amount $\Delta h$ causes an increase in the actual pressing force Fpt from the predetermined optimum initial value Fo by the amount corresponding to the additional distance x0. This additional distance x0 is about 1.0 mm, for example.

The die set information such as the thickness t of the blank 28, optimum local drawing force values Ffoi and weight Wu of the upper die 20 are read from the ID card 118 and stored in the die data memory 106 by turning an ID CARD COMM. ON-OFF selector 204 (FIG. 11) to the "ON" position and pressing an ID CARD READ pushbutton 206 (FIG. 11) on the operator's control panel 190, after the bolster 24 with the die set (20, 26, 30) is positioned on the press 10 in step Q2 described above. The die set information is displayed on a display section 208 (FIG. 10) on the panel 190. The display section 208 includes an indicator 210 for indicating an optimum total drawing force Ffot (sum of the optimum local drawing force values Floi), and an indicator 216 for indicating the weight Wu of the upper die 20.

In step Q15, the blank 28 is loaded onto the press 10. In the next step Q16, an appropriate switch is activated to effect a test drawing operation with one reciprocation of the press slide 14. The pneumatic pressure Pb of the counterbalancing pneumatic cylinders 80 has been automatically adjusted to a level almost equal to (Ws+Wu)/Ab, where Ws and Ab respectively represent the weight of the press slide 14 and the total pressure-receiving area of the cylinders 80, which are stored in the machine data memory 104, while Wu represents the weight of the upper die 20 stored in the die set memory 106. Step Q16 is followed by step Q17 in which the actual total pressing force Fpt at the lower stroke end of the slide 14 is calculated from the STRAIN signals Si and the Si-Fpi relationships stored in the machine data memory 104, and the calculated total pressing force Fpt is stored as F1 in the RAM 100. In the next step 18, a ratio $\Delta a$ is calculated according to the following equation (2), on the basis of the values Fo, F1 and x0:

$$\Delta a = (F1 - Fo)/x0 \qquad (2)$$

Figure 14:
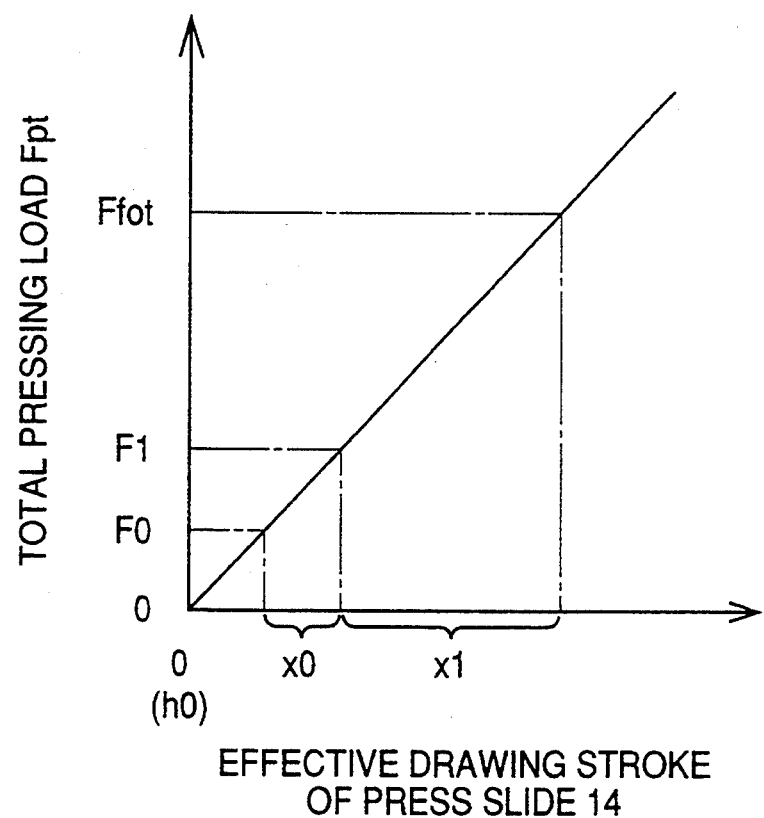
FIG. 14 is a graph for explaining the adjustment of the relative distance h1 in the routine of FIGS. 12 and 13 so that the total pressing load Fpt is substantially equal to an optimum total pressing force Ffot.

The graph of FIG. 14 indicates a relationship between the total pressing force value Fpt (Fo and F1) and the effective drawing stroke x (to the lower stroke end of the slide 14). The ratio $\Delta a$ corresponds to the gradient of a line representing the relationship which is specific to the individual press 10. The effective drawing stroke is interpreted to mean a distance between the lower stroke end of the slide 14 and the point at which the upper die 20 is brought into abutting contact with the lower die or punch 26. Suppose the relative distance h1 is h0 when the total pressing force Fpt is zero with the upper and lower dies 20, 26 in abutting contact at the lower stroke end of the slide 14, a value (h1−h0) represents the effective drawing stroke. Therefore, an increase of the distance h1 from the reference value h0 determines the effective drawing stroke, and therefore creates and determines the total pressing force Fpt. As the effective drawing stroke or distance h1 increases, the amounts of elastic deformation (elongation) of the components of the press 10 and the amount of compression of the fluid in the hydraulic cylinders 44 increase, whereby the pressing force or load Fpt increases.

Then, the control flow goes to step Q19 (FIG. 13) to calculate an adjusting amount x1 of the distance h1 according to the following equation (3), on the basis of the ratio $\Delta a$ calculated in step Q18, the optimum total drawing force Ffot (sum of the optimum local drawing force values Ffoi) stored in the die set memory 106, and the value F1 stored in the RAM 100 in step Q17.

$$x1 = (Ff - F1)/\Delta a \qquad (3)$$

The servomotor 43 is operated to adjust the distance h1 by the calculated amount x1. With the distance h1 adjusted by the amount x1, the total pressing force Fpt at the lower end of the slide 14 is substantially equal to the optimum total drawing force Ffot, as indicated in FIG. 14. At this time, the piston of the cushioning pneumatic cylinder for biasing the pressure ring 30 through the cushion pins 32 is locked in its lower end, and the pressure ring 30 is not in contact with the upper die 20 even with the slide 14 positioned at its lower stroke end. Therefore, the total holding force Fs is zero when the distance h1 is adjusted. Namely, the total pressing force Fpt is equal to the total drawing force Ff.

Step Q18 to calculate the ratio $\Delta a$ may be eliminated. In this case, the adjusting amount x1 can be calculated by substituting (F1−Fo)/x0 for the ratio $\Delta a$ in the above equation (3). That is, the adjusting amount x1 can be calculated directly from the values Fo, F1, Ffot and x0.

In the next step Q20, a test operation is again performed with another reciprocation of the press slide 14. Step Q21 is then implemented to calculate the total pressing force Fpt on the basis of the STRAIN signals Si and according to the Si-Fpi relationships stored in the machine data memory 104, and to determine whether an absolute value |Fpt−Ffot| of the difference between the calculated total pressing force Fpt and the optimum total drawing force Ffot is smaller than a predetermined tolerance value $\alpha$. The tolerance value $\alpha$ is set to be about 1.0 kN (kilo Newton) where the optimum total drawing force Ffot is about 80 kN, for example. If a negative decision (NO) is obtained in step Q21, step Q22 is implemented to incrementally or decrementally change the distance h1. Steps Q20–Q22 are repeatedly implemented until an affirmative decision (YES) is obtained in step Q21, that is, until the absolute value |Fpt−Ffot| becomes smaller than the tolerance value $\alpha$, The adjustment of the distance h1 in step Q22 may be automatically effected by obtaining the adjusting amount x1 in proportion to the difference (Fpt−Ffot) as in steps Q18 and Q19, or may be manually conducted by the operator. In the latter case, the operator compares the actual total pressing force Fpt displayed on an indicator 218 (FIG. 9) on the panel 190, with the optimum total drawing force Ffot displayed on the indicator 210, and operates the servomotor 43 by a suitable inching switch until the actual force Fpt becomes equal to the optimum force Ffot.

If an affirmative decision (YES) is obtained in step Q21, a TOTAL light 220 (FIG. 9) on the operator's control panel 190 is turned on, indicating that the total pressing load or force Fpt has been adjusted to the optimum value. Step Q21 is followed by steps Q23–Q25 for adjusting the distribution of the four individual local pressing load values Fpi (i=a, b, c, d) so that the load values Fpi substantially coincide with the respective optimum local drawing force values Ffoi (i=a, b, c, d) which are stored in the die data memory 106. This adjustment of the local pressing load values Fpi is accomplished by adjusting the hydraulic pressure levels Pa of the four overload-protective hydraulic cylinders 44, independently of each other.

Figure 15:
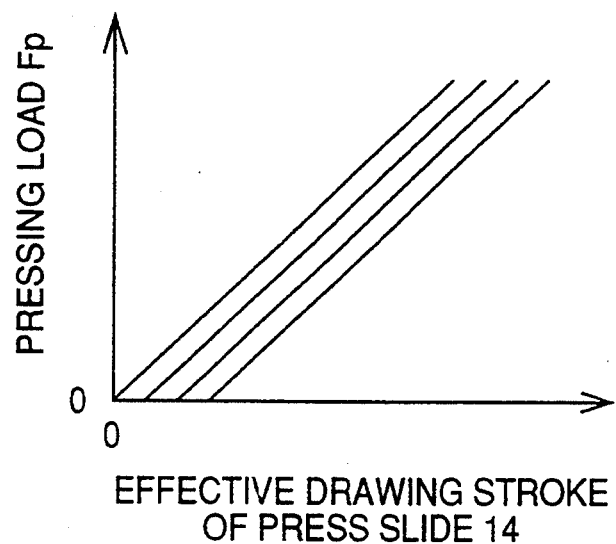
FIG. 15 is a graph indicating a difference in the pressing force Fpi at four local portions of the press of FIG. 1, in relation to the effective drawing stroke of the press slide, due to an error in parallelism of the press slide, for example.
Figure 16:
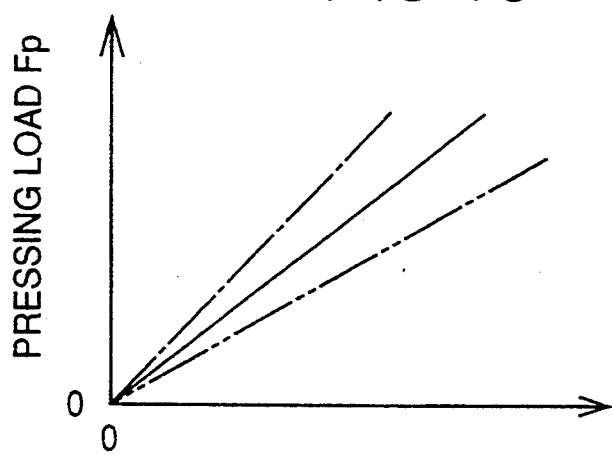
FIG. 16 is a graph indicating different relationships between the local pressing force Fpi and the effective drawing stroke of the press slide, which correspond to respective different values of the hydraulic pressure Pa applied to the die-height adjusting mechanism of FIG. 2.

Regarding the distribution of the local pressing load values Fpi, it is noted that different portions (e.g., four frame members 12) of the press 10 have different characteristics of the load variation with the effective drawing stroke of the press slide 14, due to mechanical play and gear backlash of the drive mechanism 16, parallelism error of the slide 14, and dimensional errors and rigidity variation of the individual components of the press 10. Consequently, the adjustment of the relative distance h1 for substantial coincidence of the total pressing force Fpt with the optimum total drawing force Ffot as described above will not necessarily result in substantial coincidence of the local pressing force values Fpi with the optimum local drawing force values Ffoi. Thus, the individual machines of the press 10 have different conditions of the pressing load distribution, which prevent the produced drawn articles from having a desired level of quality. For example, the parallelism error of the press slide 14 causes different relationships between the effective drawing stroke of the slide 14 and the local pressing load values Fpi as detected on the basis of the STRAIN signals Si, as indicated in the graph of FIG. 15. The local pressing load values Fpi corresponding to the four die-height adjusting mechanisms 34 cannot be adjusted by these mechanisms 34 which are simultaneously operated by the single common servomotor 43. Suppose a given local pressing load value Fpi varies with the effective drawing stroke of the slide 14 as indicated by solid line in FIG. 16, an increase in the initial pressure Pa of the corresponding hydraulic cylinder 44 prior to a pressing cycle will result in an increased rate of increase of the local pressing load value Fpi as indicated by one-dot chain line in FIG. 16, while a decrease in the initial hydraulic pressure Pa will result in a decreased rate of increase of the load value Fpi as indicated by two-dot chain line in FIG. 16. In view of this fact, therefore, the four local pressing load values Fpi can be adjusted to the respective optimum local drawing force values Ffoi independently of each other by suitably adjusting the hydraulic pressure levels Pa of the four hydraulic cylinders 44 independently of each other by controlling the corresponding solenoid-operated directional control valves 60.

Figure 13:
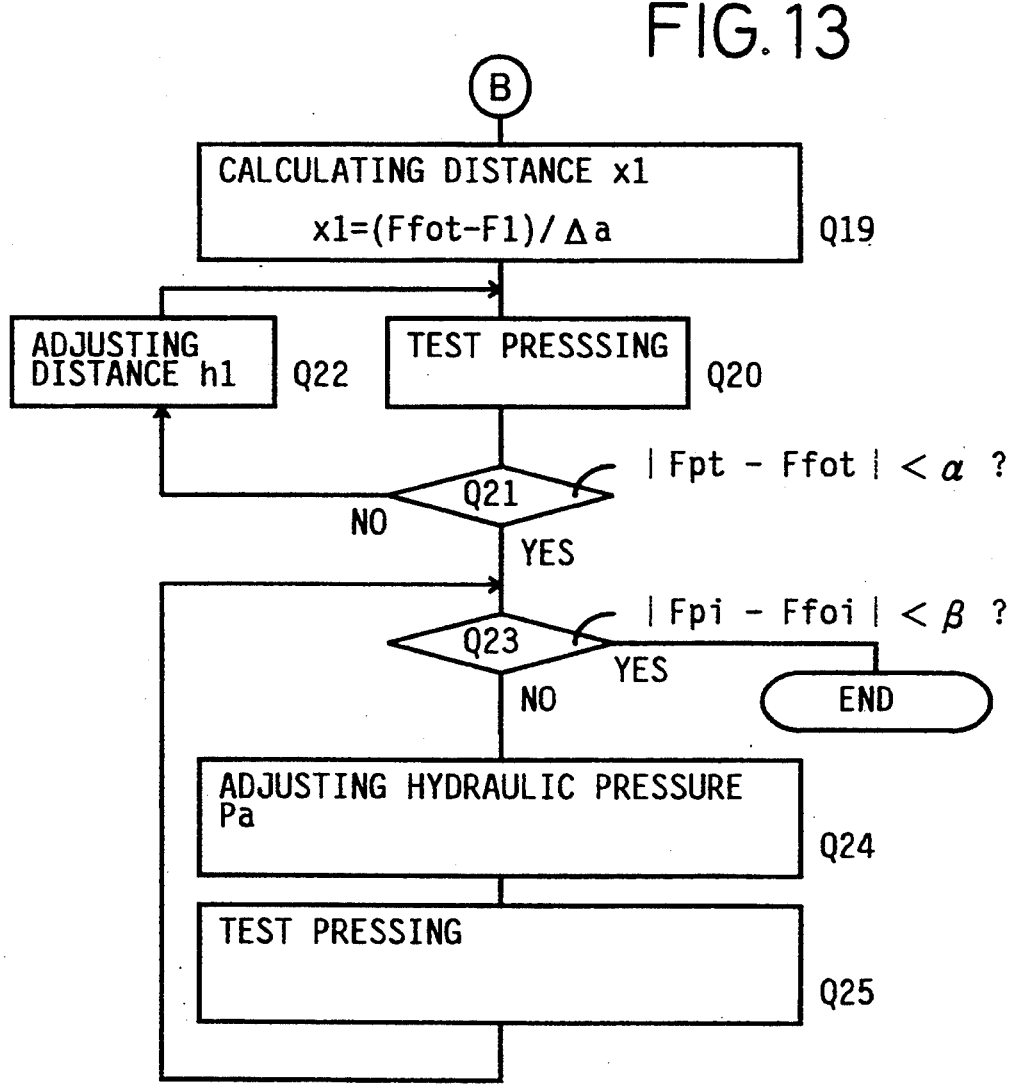

Step Q23 is provided to determine whether an absolute value |Fpi−Ffoi| of a difference between each local pressing force Fpi and the corresponding optimum local drawing force Ffoi is smaller than a predetermined tolerance value β. If an affirmative decision (YES) is obtained for all of the four local pressing force values Fpi, namely, if the above difference is within the tolerance value β for all of the four local pressing force values Fpi, the routine of FIGS. 12 and 13 is terminated with an adequate distribution adjustment of the local pressing force values Fpi so as to meet the optimum local drawing force values Ffoi. If a negative decision (NO) is obtained for any one of the four local pressing force values Fpi, step Q23 is followed by step Q24 in which four local load lights 222 on the panel 190 are turned on or off depending upon whether the corresponding difference values |Fpi−Ffoi| are within the tolerance value β or not. That is, if an affirmative decision (YES) is obtained in step Q23 for a certain local pressing force value Fpi, the corresponding one of the local load lights RF, RR, LF and LR (which correspond to the right front and rear frame members 12 and the left front and rear frame members 12) is turned on. For example, the local load lights LF and LR are turned on in the following case.

Tolerance value β: 0.3 kN
Optimum local drawing force values Ffoi:
    Right front (RF)=20 kN
    Right rear (RR)=16 kN
    Left front (LF)=23 kN
    Left rear (LR)=21 kN
Detected local pressing force values Fpi:
    Right front (RF)=25.0 kN
    Right rear (RR)=12.0 kN
    Left front (LF)=22.9 kN
    Left rear (LR)=21.1 kN In the above case, the difference values |Fpi−Ffoi| corresponding to the left front and rear corner portions of the slide 14 are within the tolerance value β.

Step Q24 is further adapted to adjust the hydraulic pressure Pa of each of the cylinders 44 which correspond to the local pressing force values Fpi whose difference |Fpi−Ffoi| is equal to or larger than the tolerance value β. In the above case, the pressure values Pa of the left front and rear cylinders 44 are adjusted.

The control flow then goes to step Q25 to effect a further pressing cycle with one reciprocation of the press slide 14. In this pressing cycle, the local pressing force values Fpi at the lower end of the slide 14 are detected on the basis of the STRAIN signals Si and according to the Si-Fpi relationships stored in the machine data memory 104. Then, the control flow goes back to step Q23 to compare the difference values |Fpi−Ffoi| with the tolerance value β. Steps Q23–A25 are repeatedly implemented until the affirmative decision (YES) is obtained for all of the four local pressing force values Fpi.

Basically, the adjustment of the hydraulic pressure Pa is effected such that the pressure Pa is raised when the difference Fpi−Ffoi is a negative value, and lowered when the difference is a positive value. The amount of adjustment in each implementation of step Q24 may be a predetermined constant value or determined as a function of the difference |Fpi−Ffoi|. The optimum hydraulic pressure Pa for establishing the optimum local drawing force Ffoi may be comparatively easily determined according to Pa-Fpi relationships which are obtained by measuring the local pressing force values Fpi in relation to the hydraulic pressure Pa, using the load measuring devices 108i installed in place of the die set (20, 26, 30). The obtained Pa-Fpi relationships are stored as machine information in the machine data memory 104. These Pa-Fpi relationships are desirably compensated for rigidity variation of the individual die sets, by test pressing using the specific die sets. Preferably, the operator's control panel 190 has indicators for displaying the detected local pressing force values Fpi and the optimum local drawing forces Ffoi. In this case, the operator may manually operate the solenoid-operated directional control valves 60 to adjust the hydraulic pressure values Pa while observing the values displayed on those indicators. When the difference |Fpi−Ffoi| is a positive value, the corresponding control valve 60 may be automatically or manually operated to lower the hydraulic pressure Pa until the detected local pressing force value Fpi is made substantially equal to the optimum value Ffoi, while the slide 14 is held at its lower stroke end. The hydraulic pressure Pa may be adjusted in any other suitable manner.

In the present press 10 arranged as described above, the local pressing load values Fpi corresponding to the four hydraulic cylinders 44 are detected on the basis of the STRAIN signals Si obtained from the outputs of the strain gages 90i, and the pressure values Pa of the individual hydraulic cylinders 44 are adjusted independently of each other, so that the detected local pressing force values Fpi substantially coincides with the predetermined optimum local drawing force values Ffoi. This arrangement permits easy and efficient reproduction of the desired distribution of the local pressing load values as established on a test or trial press for assuring high-quality products, irrespective of the different characteristics of the individual machines of the press 10. The easy reproduction of the desired pressing load distribution reduces the required time and efforts of the machine user for adjusting the die set and the pressing load distribution upon changeover of the die set. Thus, the present press 10 has improved production efficiency.

It will be understood that step Q25 is a step of detecting the local pressing load values Fpi, while steps Q23 and Q24 are steps for adjusting the values of the fluid pressure in load adjusting cylinders (44) through which the press slide 14 are connected to the drive mechanism 16. It is also noted that the optimum drawing force values Ffoi stored in the ID card 118 (die data memory 106) correspond to optimum local pressing load values.

Figure 17A:
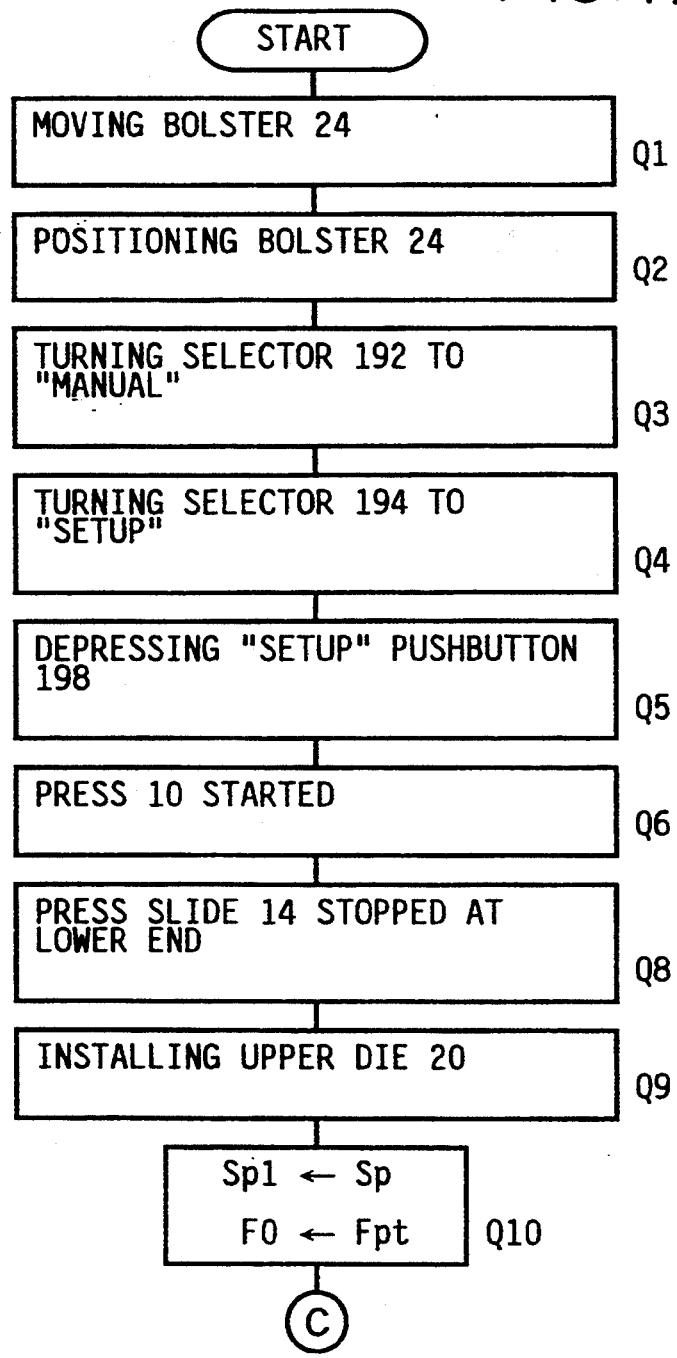

The routine of FIGS. 12 and 13 includes step Q7 to determine whether the detected total pressing load Fpt has increased to the optimum initial value Fo, so that the downward movement of the press slide 14 is stopped in step Q8 when the detected load Fpt has reached the optimum initial value Fo. However, step Q7 may be eliminated as indicated in FIG. 17. In this case, the abutting contact of the slide 14 with the upper die 20 is visually detected by the operator, and the downward movement of the slide 14 is stopped by an appropriate switch on the panel 190 when the contact of the slide 14 with the die 20 is visually detected. In this modified routine of FIG. 17(a) and 17(b), step Q10 is modified so that the detected total pressing load Fpt is stored as the optimum initial value Fo in the RAM 100, as well as the stroke Sp of the slide 14 (down to the point of contact of the slide 14 with the die 20) is stored as Sp1 in the RAM 100. These stored values Sp1 and Fo are used in the subsequent steps as described above.

Figure 18:
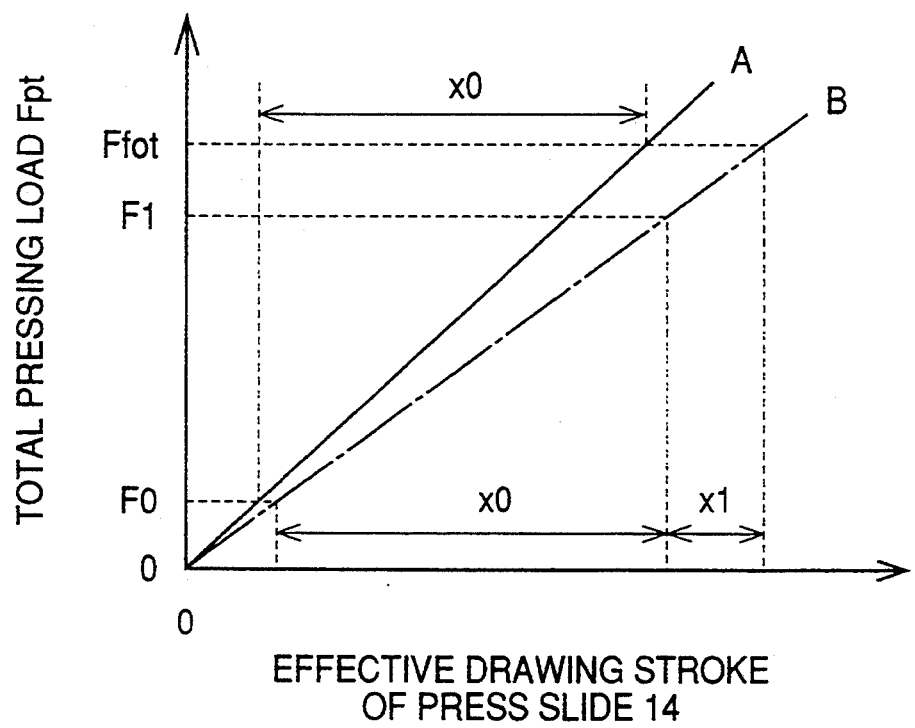
FIG. 18 is a graph corresponding to that of FIG. 14, for explaining the adjustment of the relative distance h1 in the routine of FIG. 17.

While the additional drawing distance x0 used in step Q14 is a constant value in the above embodiments of FIGS. 12-13 and FIGS. 17(a) and 17(b), it is advantageous to determine this distance x0 in the following manner. First, a Fpt-x0 relationship (hereinafter referred to as "dummy relationship A") between the total pressing load Fpt and the additional drawing distance x0 as indicated by solid line A in FIG. 18 is obtained by measuring the load value Fpt by suitable load measuring devices such the devices 108i, in relation to the additional drawing distance x0, by changing the relative distance h1. The load measuring devices are used in place of the die set (20, 26, 30). These measuring devices should include blocks whose rigidity is higher than that of the die set (20, 26, 30). The obtained dummy Fpt-x0 relationship A is stored in the machine data memory 104, and the additional drawing distance x0 corresponding to the optimum total drawing force Ffot is determined according the stored dummy Fpt-x0 relationship A. The thus determined distance x0 assures a pressing operation without an overload of the press 10. More specifically, the additional drawing distance x0 is determined on the basis of the optimum initial total pressing force Fo and the optimum total drawing force Ffot and according to the dummy Fpt-x0 relationship A. The adjusting amount Δh of the distance h1 is calculated on the basis of the determined distance x0 and according to the equation (1) given above. A Fpt-x0 relationship indicated by one-dot chain line B in FIG. 18 is the relationship (hereinafter referred to as "actual relationship B") obtained on the press 10 with the die set (20, 26, 30), which corresponds to that indicated by solid line in FIG. 14. Since the dummy relationship A is obtained with the load measuring devices whose rigidity is higher than that of the actually used die set (20, 26, 30), the rate of change in the pressing force Fpt with the distance x0 according to the actual relationship B is lower than that according to the dummy relationship A. Therefore, the additional drawing distance x0 determined according to the dummy relationship A results in a total pressing load Fpt smaller than that produced by the distance x0 determined according to the actual relationship B. Hence, the press 10 is protected from an overload due to the additional drawing distance x0. Further, the value F1 close to the optimum total drawing force Ffot is used to obtain the actual relationship B, namely, the ratio Δa (calculated in step Q18), in the embodiment of FIG. 18. This arrangement assures a reduced amount of error of the calculated adjusting amount x1 (Step Q19) of the distance h1, as compared with the arrangement of FIG. 14, whereby the adjustment of the distance h1 in step Q22 may be eliminated or the required number of adjustment of the distance h1 may be reduced.

In the modified embodiment of FIG. 18 described above, the additional drawing distance x0 is determined on the basis of the optimum total drawing force Ffot and according to the dummy Fpt-x0 relationship A. However, the distance x0 may be determined otherwise according to the dummy relationship A. The distance x0 determined may be smaller or slightly larger than that determined on the basis of the optimum total drawing force Ffot.

Figure 19:
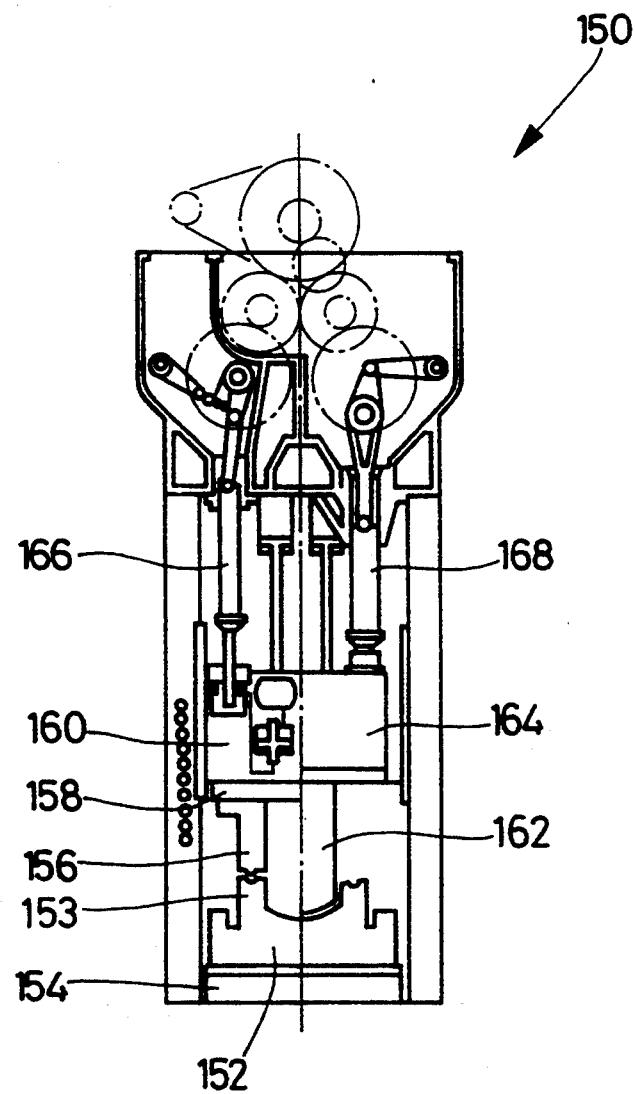
FIG. 19 is an elevational view showing an example of a double-action press whose local pressing load values are adjusted according to the present invention.

While the single-action press 10 has been described, the principle of the present invention is applicable to a double-action press 150 as shown in FIG. 19 by way of example. In the press 150, a lower die 152 is fixed to a bolster 154, and a pressure ring 156 is fixed to an outer slide 160 through a blank holder plate 158. The outer slide 160 is vertically reciprocated by four reciprocating members in the form of four outer plungers 166, while an inner slide 164 is vertically reciprocated by four reciprocating members in the form of four inner plungers 168. The lower die 152 includes a pressure portion 153, which cooperates with the pressure ring 156 to hold a peripheral portion of a blank therebetween while the blank is drawn by the die 152 and a punch 162. The pressure ring 156 and punch 162 serve as an upper die.

Figure 20:
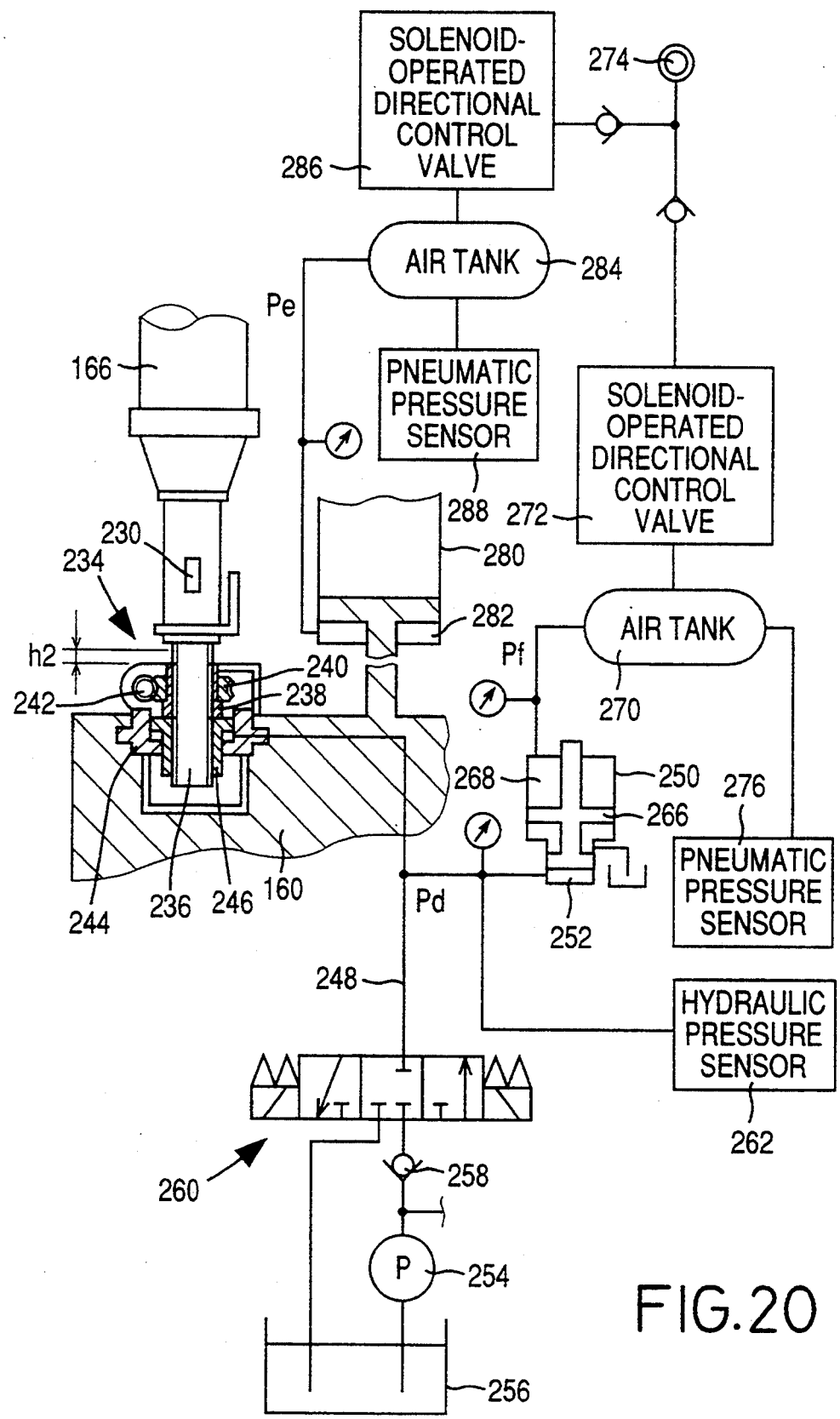
FIG. 20 is a schematic view showing a die-height adjusting mechanism provided in the press of FIG. 19.

As is apparent from FIG. 20, each of the four outer plungers 166 connected to the outer slide 160 has a strain sensor 230 in the form of strain gages for detecting a local pressing load Fpi (i=a, b, c, d) in the form of a blank holding force on the basis of a strain of the plunger 166 caused by the pressing load, in a manner similar to that in the preceding embodiments. Each outer plunger 166 is connected to the outer slide 160 through a die-height adjusting mechanism 234, which includes a threaded shaft 236, a nut 238, a worm wheel 240 and a worm 242. The worms 242 of the four die-height adjusting mechanisms 234 corresponding to the four outer plungers 166 are bidirectionally rotated by a common servomotor, so that relative distances h2 between the plungers 166 and the mechanisms 234 are concurrently adjusted to adjust the pressing or blank holding force values Fpi when the outer plungers 166 are lowered to their lower stroke ends.

The outer slide 160 incorporates four fluid-actuated cylinders in the form of four hydraulic cylinders 244 for adjusting the blank holding force Fpi. Each hydraulic cylinder 244 has a housing fixed to the corresponding corner portion of the outer slide 160, and a piston 246 fixed to the corresponding die-height adjusting mechanism 234. Each hydraulic cylinder 244 has a fluid chamber filled with a working fluid and communicating with an oil chamber 252 of a hydro-pneumatic cylinder 250 through a fluid passage 248. The fluid passage 248 is also connected to an electrically operated pump 254 through a check valve 258 and pressure control means in the form of a solenoid-operated directional control valve 260. The working fluid in a reservoir 256 is pressurized by the pump 254, and the pressurized fluid is fed to the fluid chamber of the hydraulic cylinder 244 through the valves 258, 260. A hydraulic pressure sensor 262 is provided to detect hydraulic pressure Pd in the fluid passage 248 (pressure in the hydraulic cylinder 244 and the oil chamber 252 of the hydro-pneumatic cylinder 250). The hydraulic pressure values Pd in the hydraulic cylinders 244 are regulated independently of each other by the respective control valves 260.

The hydro-pneumatic cylinder 250 also has an air chamber 268 separated by a piston 266 from the oil chamber 252 indicated above. The air chamber 268 communicates with an air tank 270 connected to an air source 274 through a solenoid-operated directional control valve 272, so that a pneumatic pressure Pf within the air chamber 268 and air tank 270 is regulated to an optimum level by the directional control valve 272. The pneumatic pressure Pf is detected by a pneumatic pressure sensor 276. The hydro-pneumatic cylinders 250, air tank 270, directional control valve 272, etc. are provided for each of the four outer plungers 160 (for each of the four die-height adjusting mechanisms 234). The pneumatic pressure values Pf in the four air tanks 270 are suitably regulated independently of each other by the respective control valves 272.

As shown in FIGS. 19 and 20, the outer slide 160 is also connected to the pistons of four counterbalancing pneumatic cylinders 280 each of which has an air chamber 282 communicating with an air tank 284, which is also connected to the air source 274 through a solenoid-operated directional control valve 286. A pneumatic pressure Pe within the air chamber 282 and the air tank 284 is adjusted by the control valve 286, to an optimum level so that the sum of the pneumatic pressure values Pe of the four counterbalancing pneumatic cylinders 280 is equal to the total weight of the outer slide 160, blank holder plate 158 and the pressure ring 156. The pneumatic pressure Pe is detected by a pneumatic pressure sensor 288. It is noted that the air chambers 282 of the four cylinders 280 are connected to the single common air tank 284.

Figure 21:
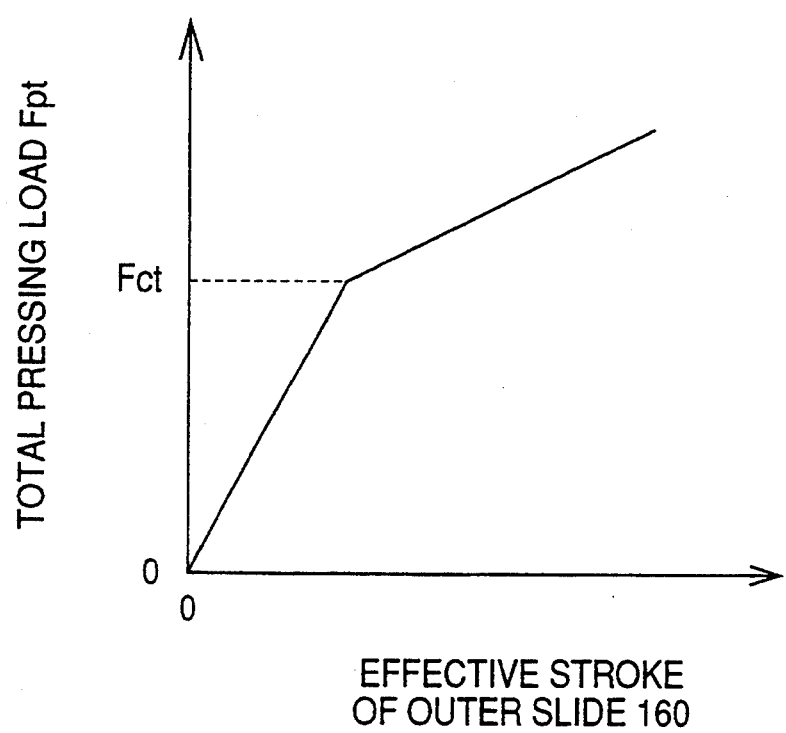
FIG. 21 is a graph indicating a relationship between the total pressing load Fpt and the effective drawing stroke of the outer slide on the press of FIG. 19.
Figure 22A:
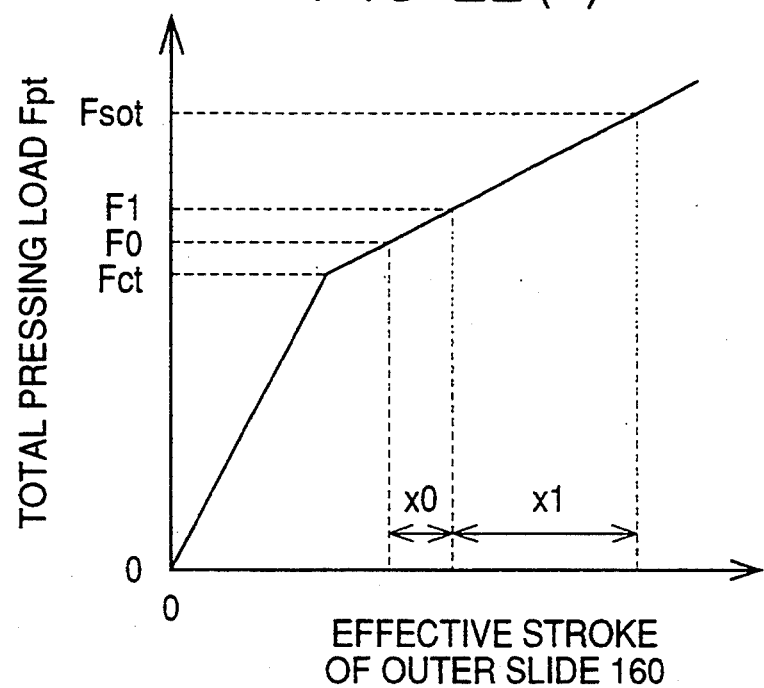
FIGS. 22(a) and 22(b) are graphs corresponding to those of FIGS. 14 and 18, respectively, for explaining the adjustment of a relative distance h2 so that the total pressing load Fsot of the outer slide of the press of FIG. 19 is substantially equal to an optimum total drawing force Fsot.
Figure 22B:
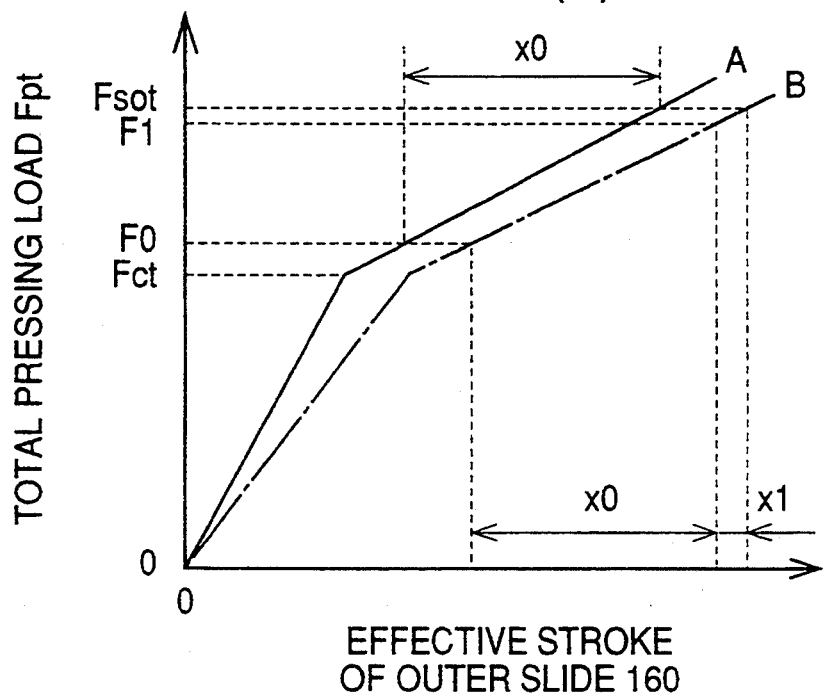

In the press 150 constructed as described above, optimum local blank holding force values Fsoi (i=a, b, c, d) corresponding to the four outer plungers 166 are stored in an ID card as indicated at 118 in FIG. 1, and the relative distance h2 is adjusted so that a total pressing load Fpt which is a sum of the local pressing force values Fpi detected by the strain gages 230 is equal to an optimum total blank holding force Fsot which is a sum of the optimum local blank holding force values Fsoi. Then, the hydraulic pressure values Pd or pneumatic pressure values Pf are adjusted so that the local pressing force values Fpi coincides with the respective optimum blank holding force values Fsoi stored in the ID card. A relationship between the total pressing load Fpt and the effective stroke of the outer slide 160 on the present press 150 is represented by a bent line as indicated in FIG. 21, which is bent at a critical load value Fct. The load Fpt below the critical value Fct is based on elastic deformation of the machine components and compression of the fluid in the hydraulic cylinders 244, as on the press 10, while the load Fpt above the critical value Fct is based on the retracting movement of the piston 266 of each hydro-pneumatic cylinder 250. The critical point Fct is determined by the pneumatic pressure Pf and the pressure-receiving area of the piston 266 on the side of the air chamber 268. In view of this fact, a total pressure-receiving area of the pistons 266 of the four cylinders 266 is stored as machine information, and the critical point Fct is determined based on the initial value of the pneumatic pressure Pf prior to the pressing load adjustment of the press 150. The optimum pressing load Fo is selected to be slightly larger than the critical point Fct, as indicated in the graph of FIGS. 22(a) and 22(b), and the relative distance h2 is adjusted so that the total pressing force Fpt is substantially equal to the optimum total holding force Fsot, in a manner similar to that in the preceding embodiments. FIG. 22(a) shows the case where the additional distance x0 is constant as in the case of FIG. 14, while FIG. 22(b) shows the case where the additional distance x0 is determined according to a stored dummy Fpt-x0 relationship A as in the case of FIG. 18.

Figure 23:
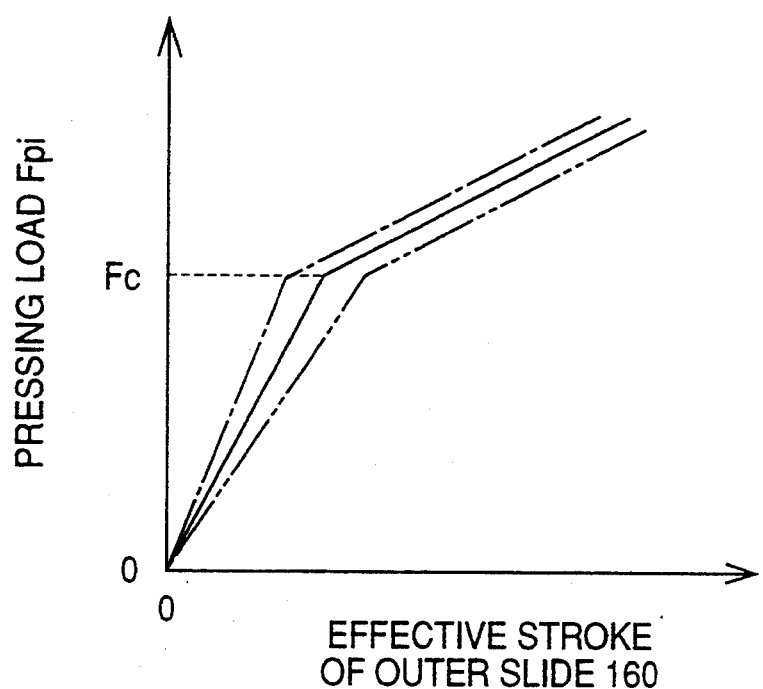
FIG. 23 is a graph indicating different relationships between the local pressing force Fpi and the effective drawing stroke of the press slide, which correspond to respective different values of hydraulic pressure Pd applied to the die-height adjusting mechanism of FIG. 19.

The local pressing load values Fpi detected by the strain gages 230 on the four outer plungers 166 vary with the effective stroke of the outer slide 160, as indicated in FIGS. 22(a) and 22(b). Suppose the relationship as indicated by solid line in FIG. 23 is obtained, increasing the hydraulic pressure Pd in the hydraulic cylinder 244 will change the relationship to a relationship indicated by one-dot chain line in which the rate of change of the value Fpi below the critical point Fc is higher than that of the solid line. On the other hand, decreasing the hydraulic pressure Pd will change the relationship to a relationship indicated by two-dot chain line in which the rate of change of the value Fpi below the critical point Fc is lower than that of the solid line. In view of this fact, the independent adjustments of the hydraulic pressure values Pd of the four cylinders 244 by the respective flow control valves 260 make it possible to suitably adjust the local blank holding forces so that the local pressing force values Fpi as detected by the strain gages 230 substantially coincide with the respective optimum local blank holding force values Fsoi, as in steps Q23–Q25 in the flow chart of FIG. 13. This arrangement assures efficient reproduction of the desired distribution of the local blank holding force values as established on a test or trial press, irrespective of the different characteristics of the individual machines of the press 150. The cylinders 244 correspond to the cylinders 44 of FIG. 2, while the optimum local blank holding force values Fsoi correspond to the optimum local pressing force values.

Figure 24:
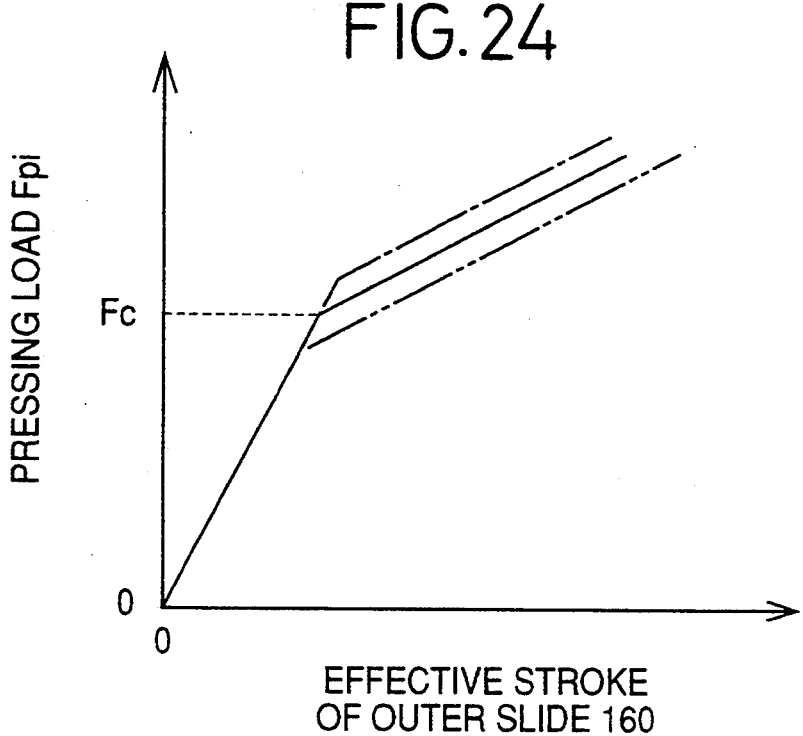
FIG. 24 is a graph indicating different relationships between the local pressing force Fpi and the effective drawing stroke of the press slide, which correspond to respective different values of pneumatic pressure Pf applied to the die-height adjusting mechanism of FIG. 19.

The critical point Fc is changed by changing the pneumatic pressure Pf of the cylinder 250. Suppose the relationship indicated by solid line in FIG. 24 is obtained, increasing the pneumatic pressure Pf of the cylinder 250 will raise the critical point Fc as indicated by one-dot chain line in FIG. 24, while decreasing the pneumatic pressure Pf will lower the critical point Fc as indicated by two-dot chain line. In view of this fact, the independent adjustments of the pneumatic pressure values Pf of the four cylinders 250 by the respective flow control valves 272 make it possible to suitably adjust the local blank holding forces so that the local pressing force values Fpi as detected by the strain gages 230 substantially coincide with the respective optimum local blank holding force values Fsoi, as in steps Q23–Q25 in the flow chart of FIG. 13. This arrangement also assures efficient reproduction of the desired distribution of the local blank holding force values as established on a test or trial press, irrespective of the different characteristics of the individual machines of the press 150. In this case, the cylinders 250 correspond to the cylinders 50 of FIG. 2.

The adjustment of the hydraulic pressure values Pd or pneumatic pressure values Pf need not be effected automatically but may be manually effected by the operator using suitable switches to control the appropriate control valve 260, 272.

Like the outer plungers 166, the four inner plungers 168 are connected to the inner slide 164 through respective die-height adjusting mechanisms. Local pressing load values corresponding to these four outer plungers 168 are also detected by strain gages provided on the plungers 168. The relative distance between the outer plungers 168 and the die-height adjusting mechanisms and the pressure values of the hydraulic cylinders associated with the die-height adjusting mechanisms are adjusted as in the first embodiment so that the detected local pressing load values substantially coincide with the optimum local pressing load values stored in an ID card (die data memory).

While the present invention has been described in detail in its presently preferred embodiments for illustrative purpose only, it is to be understood that the invention may be otherwise embodied.

For instance, the principle of the present invention is equally applicable to a single-action or double-action press whose slide or slides are hydraulically operated, and to a press adapted to perform an operation other than a drawing operation, for example, a bending operation.

While the illustrated embodiments use strain sensors in the form of the strain gages $90i$, 230, any other types of strain sensors such as electrical capacitance type, optical type and differential transformer type may be used provided the sensors are capable of detecting a tensile strain of the frame members 12 or a compressible strain of the plungers 166.

In the illustrated first embodiment, the strain gages $90i$ are attached to the four frame members 12 to detect the local pressing load values Fpi, the strain sensors may be attached to the plungers 18, as in the double-action press 150.

The operator's control panel 190 is capable of displaying the various load values such as the local holding force values Fsi, local drawing force values Ffi, total holding force Fs, total drawing force Ff, and total pressing force Fpt. However, only the selected ones or none of these load values may be displayed. In the latter case, the obtained load values are used only for the purpose of automatic load adjustment and monitoring of the press.

In the illustrated embodiments, the measurement of the actual pressing load values is effected using the strain gages $110i$ and the electromagnetic oscilloscope 114, it is possible to use other load measuring or detecting devices such as a magnetostrictive force sensor utilizing magneto striction, and other recording means having excellent response characteristics.

In the illustrated first embodiment, the Fpi-Si relationships between the local pressing force values Fpi and the level of the STRAIN signals Si are obtained by changing the effective drawing stroke of the press slide 14, it is possible to obtain the Fpi-Si relationships by changing the height dimension of the load measuring devices $108i$ using height adjusting shims of different thickness values, or by changing the pressure Pa in the oil chambers 52 of the hydro-pneumatic cylinders 50. Such Fpi-Si relationships may be obtained in any other manner provided the relationships represent the amounts of elongation of the frame members 12 in relation to the pressing force applied thereto.

In the first embodiment, the hydraulic pressure values Pa of the four hydraulic cylinders 44 are adjusted without the holding force applied to the blank 28 even with the press slide 14 lowered to its lower stroke end, namely, while the cushioning air cylinder associated with the cushion pins 32 is locked at its lower stroke end. However, the adjustment of the hydraulic pressure values Pa to establish the optimum local pressing force values may be effected while the holding force is applied to the blank 28 from the cushioning air cylinder. In this case, each local pressing force value Fpi as detected by the strain gages $110i$ should be substantially equal to a sum of the optimum drawing force value Ffoi and the optimum holding force Fsoi. Therefore, the optimum local pressing force values Fpoi=Ffoi+Fsoi should be stored in the ID card 118 (die data memory 106).

The embodiment of FIG. 19 is adapted to adjust the local pressing force values Fpi of the outer slide 160 in a range above the critical point Fc, that is, after the piston 266 of the cylinder 250 begins to be retracted toward the air chamber 268. However, the local pressing force values Fpi in a range below the critical point Fc may be adjusted. In this case, the adjustment may be made in the same manner as in the first embodiment.

Conversely, the first embodiment may be adapted to adjust the local pressing force values Fpi after the piston 66 begins to be retracted toward the air chamber 68. In this case, the adjustment may be made in the same manner as described above with respect to the outer slide 160. The same applies to the pressing force values of the inner slide 164.

In the illustrated embodiments, the relative distances h1, h2, hydraulic pressures Pa, Pd and pneumatic pressure Pf of the presses 10, 150 are manually adjusted by the operator using the switches provided on the operator's control panel, these adjustments may be made a fully automatic mode under the control of the controller (92).

In the embodiment of FIG. 19 in which the strain gages 230 are attached to the outer plungers 166, there is substantially no discrepancy between the actual load values and the load values as detected by the strain gages 230. Consequently, it is not necessary to compensate the detected load values according to stored relationships (Fpi-Si relationships) obtained by the load measuring devices as used in the first embodiment. Namely, the load values as detected by the strain gages 230 may be used to adjust the actual load values.

Although the information on the die set is stored in the ID card 118 attached to the die set in the illustrated embodiment, the die set information may be stored in a control computer of the press, in relation to the different die sets available for use on the press, where the number of the die sets is relatively small. The die set information may be stored in a floppy disk, a magnetic tape or any other suitable memory means, or may be keyed into the control computer by the operator as needed.

While the present invention has been described as applied to the presses 10, 150 adapted to perform a drawing operation on the workpiece, the principle of the invention is equally applicable to various other types of pressing machines such as a bending press.

It will be understood that the present invention may be embodied with various other changes, modifications and improvements, which may occur to those skilled in the art, in the light of the foregoing teachings.

What is claimed is:

1. A device for measuring a pressing load value on a press having a press slide and a frame for supporting the press slide, said device including at least one strain sensor attached to said frame for detecting an amount of elongation of said frame, and measuring said pressing load value on the basis of an output level of said at least one strain sensor, said device comprising:

relationship obtaining means for obtaining a relationship between said output level of said at least one strain sensor and an actual pressing load value at a pressing portion of the press;

memory means for storing a data map representative of said relationship; and converting means for converting said output of said at least one strain sensor into said pressing load value according to said relationship whose data map is stored in said memory means.

2. A device according to claim 1, wherein said at least one strain sensor consists of a plurality of strain sensors attached to respective frame members of said frame.

3. A device according to claim 1, wherein said relationship obtaining means comprises load detecting means for detecting said actual pressing load value at said pressing portion of the press, and output detecting means for detecting the level of the output of said at least one strain sensor as said actual pressing load value is changed.

4. A device for measuring a pressing load value on a press having a press slide and a frame for supporting the press slide, said device including a plurality of strain sensors attached to respective members of said frame for detecting an amount of elongation of said frame, and measuring said pressing load value on the basis of output signal levels of said strain sensors, said device further comprising:

memory means for storing data maps representative of respective relationships between the output signal levels of said plurality of strain sensors and actual local pressing load values at local pressing portions of the press corresponding to said respective frame members; and converting means for converting said output signal levels of said plurality of strain sensors into said pressing load value according to the relationship of one of said data maps stored in said memory means.

5. A device according to claim 4, wherein said converting means converts the level of the output signal of each of said plurality of strain sensors into the corresponding actual local pressing load value according to one of said relationships which corresponds to said each strain sensor, said device further including calculating means for calculating an actual total pressing load value by summing up the actual local pressing load values obtained by said converting means on the basis of said output signals of said plurality of strain sensors and according to said respectively relationships stored in said memory means.

6. A device according to claim 4, wherein said frame members consist of four frame members for supporting said press slide at respective four corner portions of said press slide, so that the local pressing load values at said respective four corner portions of the press slide are detected on the basis of the output signals of said plurality of strain sensors attached to said four frame members, and according to said respective relationships stored in said memory means.

7. A device according to claim 6, wherein said press includes a drive mechanism for reciprocating said press slide, and four die-height adjusting mechanisms associated said four corner portions of said press slide and respective four portions of said drive mechanism, for adjusting a relative distance between said press slide and said drive mechanism at said four corner portions of said press slide, to thereby adjust the local pressing load values that are to be detected by said plurality of strain sensors and according to said respective relationships.

8. A method of adjusting local pressing load values on a press having a press slide which is connected to a reciprocating member of a drive mechanism through a plurality of fluid-actuated cylinders and which is vertically reciprocated by said reciprocating member, said local pressing load values acting on said press slide at respective local portions thereof through said fluid-actuated cylinders, respectively, when a pressing operation on a workpiece is performed by an reciprocating action of said press slide with an upper die attached thereto, said method comprising the steps of:

measuring the actual local pressing load values at said local portions of said press slide corresponding to said plurality of fluid-actuated cylinders; and adjusting pressure values of a fluid in said plurality of fluid-actuated cylinders independently of each other so that the measured actual local pressing load values at said local portions of the press slide substantially coincide with respective predetermined optimum values.

9. A method according to claim 8, wherein said step of measuring the actual pressing load values at said local portions of said press slide comprises attaching a plurality of strain sensors to respective members of the press corresponding to said local portions of the press slide, and obtaining said actual local pressing load values on the basis of output signals of said strain sensors.

10. A method according to claim 9, wherein said attaching a plurality of strain sensors comprises attaching said strain sensors to frame members which support said press slide.

11. A method according to claim 8, wherein said attaching a plurality of strain sensors comprises attaching said strain sensors a plurality of plungers as said reciprocating member of said drive mechanism.

12. A method of adjusting local pressing load values on a press having a press slide connected to a reciprocating member of a drive mechanism through a plurality of fluid-actuated cylinders and vertically reciprocated by said reciprocating member, said local pressing load values acting on said press slide at respective local portions thereof through said fluid-actuated cylinders, respectively, when a pressing operation on a workpiece is performed by a reciprocating action of said press slide with an upper die attached thereto, said method comprising the steps of:

measuring the actual local pressing load values at said local portions of said press slide corresponding to said plurality of fluid-actuated cylinders by attaching a plurality of strain sensors to respective members of the press corresponding to said local portions of the press slide, obtaining said actual local pressing load values on the basis of output signals of said strain sensors, storing in memory means data maps representative of respective relationships between the output signal levels of said strain sensors and the actual local pressing load values at said local portions of the press slide, and converting the output signal levels of said strain sensors into said actual local pressing load values according to said respective relationships; and adjusting pressure values of a fluid in said plurality of fluid-actuated cylinders independently of each other so that the measured actual local pressing load values at said local portions of the press slide substantially coincide with respective predetermined optimum values.

13. A method of adjusting local pressing load values on a press having a press slide which is connected to a reciprocating member of a drive mechanism through a plurality of fluid-actuated cylinders and which is vertically reciprocated by said reciprocating member, said local pressing load values acting on said press slide at respective local portions thereof through said fluid-actuated cylinders, respectively, when a pressing operation on a workpiece is performed by a reciprocating action of said press slide with an upper die attached thereto, said method comprising the steps of:

measuring the actual local pressing load values at said local portions of said press slide corresponding to said plurality of fluid-actuated cylinders; and adjusting pressure values of a fluid in said plurality of fluid-actuated cylinders independently of each other so that the measured actual local pressing load values at said local portions of the press slide substantially coincide with respective predetermined optimum values, said step of adjusting pressure values of a fluid in said plurality of fluid-actuated cylinders independently of each other comprising adjusting hydraulic pressure values of a plurality of hydraulic cylinders disposed between respective four corner portions of said press slide and respective plungers as said reciprocating member of said drive mechanism.

14. A method according to claim 13, further comprising the steps of providing a plurality of height-adjusting mechanisms which are each connected at one end thereof to said hydraulic cylinders, respectively, and at the other end thereof to said plungers, respectively, said height-adjusting mechanisms being operated to adjust a relative distance between said press slide and said plungers, and wherein said hydraulic pressure values of said hydraulic cylinders are adjusted independently of each other after a total pressing load acting on said press slide is adjusted to a predetermined optimum value by adjustment of said relative distance by said height-adjusting mechanisms.

15. A method of adjusting local pressing load values on a press having a press slide which is connected to a reciprocating member of a drive mechanism through a plurality of fluid-actuated cylinders and which is vertically reciprocated by said reciprocating member, said local pressing load values acting on said press slide at respective local portions thereof through said fluid-actuated cylinders, respectively, when a pressing operation on a workpiece is performed by a reciprocating action of said press slide with an upper die attached thereto, said method comprising the steps of:

measuring the actual local pressing load values at said local portions of said press slide corresponding to said plurality of fluid-actuated cylinders; and adjusting pressure values of a fluid in said plurality of fluid-actuated cylinders independently of each other so that the measured actual local pressing load values at said local portions of the press slide substantially coincide with respective predetermined optimum values, said step of adjusting pressures values of a fluid in said plurality of fluid-actuated cylinders independently of each other comprising determining whether a difference between each of the measured actual local pressing load value and a corresponding one of said predetermined optimum values is larger than a predetermined upper limit, and changing the pressure value of the fluid in a corresponding one of said fluid-actuated cylinders if said difference is larger than said predetermined upper limit.

16. A method of adjusting local pressing load values on a press having a press slide which is connected to a reciprocating member of a drive mechanism through a plurality of fluid-actuated cylinders and which is vertically reciprocated by said reciprocating member, said local pressing load values acting on said press slide at respective local portions thereof through said fluid-actuated cylinders, respectively, when a pressing operation on a workpiece is performed by a reciprocating action of said press slide with an upper die attached thereto, said method comprising the steps of:

measuring the actual local pressing load values at said local portions of said press slide corresponding to said plurality of fluid-actuated cylinders;

adjusting pressure values of a fluid in said plurality of fluid-actuated cylinders independently of each other so that the measured actual local pressing load values at said local portions of the press slide .substantially coincide with respective predetermined optimum values; and connecting said fluid-actuated cylinders to a common pressure source through respective pressure control means, and wherein said step of adjusting pressure values of a fluid in said plurality of fluid-actuated cylinders independently of each other comprises adjusting said pressure values by controlling said respective pressure control means.

* * * * *

UNITED STATES PATENT AND TRADEMARK OFFICE
CERTIFICATE OF CORRECTION

PATENT NO. : 5,450,756
DATED : September 19, 1995
INVENTOR(S) : Kazunari KIRII et al.

It is certified that error appears in the above-indentified patent and that said Letters Patent is hereby corrected as shown below:

Claim 5, col. 24, line 13, "respectively" should read --respective--.

Claim 8, col. 24, line 42, "an" should read --a--.

Claim 11, col. 24, line 65, "claim 8" should read --claim 9--.

Signed and Sealed this

Second Day of January, 1996

Attest:

BRUCE LEHMAN

Attesting Officer

Commissioner of Patents and Trademarks